(12) United States Patent
Tanaka et al.

(10) Patent No.: US 9,349,335 B2
(45) Date of Patent: May 24, 2016

(54) DISPLAY DEVICE, ELECTRONIC DEVICE COMPRISING SAME, AND DRIVE METHOD FOR DISPLAY DEVICE

(71) Applicant: Sharp Kabushiki Kaisha, Osaka-shi, Osaka (JP)

(72) Inventors: Noriyuki Tanaka, Osaka (JP); Kouji Kumada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 36 days.

(21) Appl. No.: 14/378,667

(22) PCT Filed: Feb. 15, 2013

(86) PCT No.: PCT/JP2013/053656
§ 371 (c)(1),
(2) Date: Aug. 14, 2014

(87) PCT Pub. No.: WO2013/125459
PCT Pub. Date: Aug. 29, 2013

(65) Prior Publication Data
US 2015/0029167 A1    Jan. 29, 2015

(30) Foreign Application Priority Data
Feb. 24, 2012  (JP) ................................ 2012-038917

(51) Int. Cl.
*G09G 3/36* (2006.01)
*H04N 5/66* (2006.01)
(Continued)

(52) U.S. Cl.
CPC ............ *G09G 3/3618* (2013.01); *G09G 3/3648* (2013.01); *H04N 5/21* (2013.01);
(Continued)

(58) Field of Classification Search
CPC ............ G09G 3/3648; G09G 2310/08; G09G 3/3618; G09G 2320/10; G09G 2340/0435
See application file for complete search history.

(56) References Cited

U.S. PATENT DOCUMENTS

2002/0093473 A1    7/2002  Tanaka et al.
2002/0180673 A1*   12/2002 Tsuda ............... G02F 1/136213
                                                    345/87
(Continued)

FOREIGN PATENT DOCUMENTS

JP    2000-347762 A    12/2000
JP    2001-312253 A    11/2001
(Continued)

OTHER PUBLICATIONS

Official Communication issues in International Patent Application No. PCT/JP2013/053656, mailed on May 21, 2013.
(Continued)

*Primary Examiner* — Ariel Balaoing
(74) *Attorney, Agent, or Firm* — Keating & Bennett, LLP

(57) ABSTRACT

Provided is a display device capable of displaying a smooth video even when pause drive is performed.
In a liquid crystal display device with an animation function, 12-Hz pause drive is performed with vertical display periods, each having a duration of five frames. In a video display period, an animation video changes every duration of a secondary video display period, i.e., every one frame, in the order: images A to X, then A and B. Once the video display period starts, 12-Hz pause drive switches to 60-Hz normal drive. In this case, for the animation video that changes every duration of the secondary video display period, i.e., every one frame, in the order: images A to X, then A and B, refresh is performed every duration of the vertical display period, i.e., every one frame. In this manner, the duration of the vertical display period is set to be the same as the duration of the secondary video display period, whereby refresh is performed individually for images A to X, A, and B included in the animation video.

20 Claims, 13 Drawing Sheets

(51) Int. Cl.
*H04N 5/21* (2006.01)
*H04N 7/01* (2006.01)

(52) U.S. Cl.
CPC .............. *H04N 5/66* (2013.01); *H04N 7/0127* (2013.01); *G09G 2310/08* (2013.01); *G09G 2320/0261* (2013.01); *G09G 2320/10* (2013.01); *G09G 2340/0435* (2013.01)

(56) References Cited

U.S. PATENT DOCUMENTS

| | | |
|---|---|---|
| 2004/0036669 A1 | 2/2004 | Yanagi et al. |
| 2007/0126666 A1* | 6/2007 | Yamazaki ............ G09G 3/2022 345/76 |
| 2012/0242923 A1 | 9/2012 | Miyamoto et al. |
| 2014/0015869 A1 | 1/2014 | Takahashi et al. |

FOREIGN PATENT DOCUMENTS

| | | |
|---|---|---|
| JP | 2002-278523 A | 9/2002 |
| JP | 2004-078124 A | 3/2004 |
| JP | 2005-037685 A | 2/2005 |
| WO | 2011/104791 A1 | 9/2011 |
| WO | 2012/141142 A1 | 10/2012 |

OTHER PUBLICATIONS

Tanaka et al., "Display Device, Electronic Device Comprising Same, and Drive Method for Display Device", U.S. Appl. No. 14/378,663, filed Aug. 14, 2014.

\* cited by examiner

US 9,349,335 B2

DISPLAY DEVICE, ELECTRONIC DEVICE COMPRISING SAME, AND DRIVE METHOD FOR DISPLAY DEVICE

TECHNICAL FIELD

The present invention relates to display devices, particularly to a display device in which pause drive is performed, an electronic device including the display device, and a method for driving the display device.

BACKGROUND ART

Conventionally, there is some demand for a reduction in power consumption in display devices such as liquid crystal display devices. Accordingly, for example, Patent Document 1 discloses a display device drive method in which a scanning period (also called a refresh period) T1, in which screen refresh is performed by scanning gate lines of a liquid crystal display device, is followed by a pause period (no-refresh period) T2, in which the refresh is paused by stopping the scanning of all of the gate lines. For example, it is possible to make settings such that control signals are not provided to a gate driver and/or a source driver during the pause period T2. As a result, it is possible to pause the operation of the gate driver and/or the operation of the source driver, resulting in reduced power consumption. The drive performed with the refresh period followed by the no-refresh period, as in the drive method described in Patent Document 1, is called, for example, "pause drive". Note that pause drive is also called "low-frequency drive" or "intermittent drive". The pause drive as above is suitable for displaying still images. Besides Patent Document 1, for example, Patent Documents 2 to 5 disclose inventions relevant to pause drive.

Incidentally, there is a known function of generating video data on the basis of frame image data and providing display based on the video data. Such a function is called by different names depending on the types of video. A video which changes two-dimensionally in part or in whole or changes one-dimensionally in part is called an "animation video", and the function of displaying an animation video is called, for example, an "animation function". A video which repeats a one-dimensional change in whole is called, for example, a "rotation video", and the function of displaying a rotation video is called, for example, a "rotation function". It should be noted that such classification of video types is merely illustrative. With the animation function or the rotation function, it is possible to display a video loop readily without receiving image data externally.

For example, a display device with the animation function is capable of selectively displaying either an animation video or animation still images consisting of the same type of frame images from among a plurality of frame images that constitute the animation video. Hereinafter, where the animation video and the animation still images are not specifically distinguished from each other, they will be referred to as "animation images". Moreover, for example, a display device with the rotation function is capable of selectively displaying either a rotation video or rotation still images consisting of the same type of frame images from among a plurality of frame images that constitute the rotation video. Hereinafter, where the rotation video and the rotation still images are not specifically distinguished from each other, they will be referred to as "rotation images". Unless otherwise specified, the following descriptions will be directed mainly to the "animation function". However, it should be noted that similar descriptions apply to the "rotation function".

CITATION LIST

Patent Documents

Patent Document 1: Japanese Laid-Open Patent Publication No. 2001-312253
Patent Document 2: Japanese Laid-Open Patent Publication No. 2000-347762
Patent Document 3: Japanese Laid-Open Patent Publication No. 2002-278523
Patent Document 4: Japanese Laid-Open Patent Publication No. 2004-78124
Patent Document 5: Japanese Laid-Open Patent Publication No. 2005-37685

SUMMARY OF THE INVENTION

Problems to be Solved by the Invention

Now consider a case where pause drive as described above is performed in a conventional liquid crystal display device with the animation function. FIG. 13 is a diagram describing the operation of the conventional liquid crystal display device with the animation function. FIG. 13(A) shows animation images (windmill). FIG. 13(B) shows images displayed on the screen of the conventional liquid crystal display device by refreshing the screen (referred to below as "refresh images"). Herein, a period in which to display an animation video or a rotation video will be referred to as a "video display period". In FIGS. 13(A) and 13(B), each rectangular box corresponds to one frame. As shown in FIG. 13(A), prior to the video display period, the animation still image is image A, and during the video display period, the animation video sequentially changes every frame in the order: images A to X, then A and B, so that the animation still image after the video display period is image B. The animation video shows a rotating windmill. The rectangular boxes shown in FIG. 13(B) represent the frames in which to refresh the screen (referred to below as "refresh frames"), and the frames other than the refresh frames (where no rectangular boxes are shown) represent frames in which to pause the refreshing of the screen (referred to below as "no-refresh frames"). In the no-refresh frame, a refresh image for the immediately preceding refresh frame continues to be displayed.

Prior to the video display period, refresh is performed every predetermined number of frames (e.g., every five frames), so that image A is displayed on the screen. More specifically, pause drive at 12 Hz is performed. Pause drive at 12 Hz continues to be performed still after the start of the video display period. Note that the timing of refresh is off before or after the video display period such that refresh is performed in the first frame of the video display period, but this is not requisite. During the video display period, the animation video sequentially changes every frame in the order: images A to X, then A and B, as described above. However, refresh is performed only every five frames. Accordingly, although the animation video should be displayed on the screen in the order: images A to X, then A and B, refresh is not performed for some of the images. As a result, images A, F, K, P, U, and B are displayed on the screen in this order, as shown in FIG. 13(B). Therefore, the animation video does not change smoothly during the video display period. In the case where drive at 60 Hz (normal drive) is performed, this problem does not occur because refresh is performed every frame. In this manner, in the case where pause drive is performed in conventional liquid crystal display devices with the animation function, the animation video lacks smoothness.

Therefore, an objective of the present invention is to provide a display device capable of displaying a smooth video even when pause drive is performed, an electronic device including the display device, and a method for driving the display device.

Solution to the Problems

A first aspect of the present invention is directed to a display device comprising:
a display portion including a plurality of image forming portions;
a drive portion for driving the display portion; and
a control portion for controlling the drive portion, wherein,
the control portion includes a refresh rate control portion for controlling a refresh rate determined in accordance with the proportion of a refresh period for refreshing a screen of the display portion and a no-refresh period for pausing the refreshing of the screen, and
when control is performed in accordance with a refresh rate at which the no-refresh period has a duration greater than or equal to the refresh period, a first period of a video display period in which a video is displayed on the screen has a duration less than or equal to a duration of a second period, the first period lasting from the start of the refresh period to the start of another refresh period immediately following the refresh period, the second period being a period in which one of a plurality of frame images included in the video is displayable on the screen.

In a second aspect of the present invention, based on the first aspect of the invention, the control portion further includes a video data generation portion for generating video data representing the video from frame image data representing a predetermined number of the frame images.

In a third aspect of the present invention, based on the second aspect of the invention, the refresh rate control portion changes the refresh rate such that the first period of the video display period is the refresh period.

In a fourth aspect of the present invention, based on the second aspect of the invention, the first period of the video display period includes the refresh period and the no-refresh period.

In a fifth aspect of the present invention, based on the fourth aspect of the invention, the refresh rate control portion sets the duration of the first period of the video display period in accordance with the duration of the second period.

In a sixth aspect of the present invention, based on the fourth aspect of the invention, the video data generation portion sets the duration of the second period of the video display period in accordance with the duration of the first period.

In a seventh aspect of the present invention, based on any of the first through sixth aspects of the invention, the image forming portion includes a thin-film transistor with a control terminal connected to a scanning line in the display portion, a first conductive terminal connected to a signal line in the display portion, a second conductive terminal to which a voltage in accordance with an image to be displayed is applied, the second conductive terminal being connected to a pixel electrode in the display portion, and a channel layer made of an oxide semiconductor.

An eighth aspect of the present invention is directed to an electronic device comprising:

a display device of the first aspect of the invention; and
a video data generation portion for generating video data representing the video from frame image data representing a predetermined number of the frame images.

In a ninth aspect of the present invention, based on the eighth aspect of the invention, the refresh rate control portion changes the refresh rate such that the first period of the video display period is the refresh period.

In a tenth aspect of the present invention, based on the eighth aspect of the invention, the first period of the video display period includes the refresh period and the no-refresh period.

In an eleventh aspect of the present invention, based on the tenth aspect of the invention, the refresh rate control portion sets the duration of the first period of the video display period in accordance with the duration of the second period.

In a twelfth aspect of the present invention, based on the tenth aspect of the invention, the video data generation portion sets the duration of the second period of the video display period in accordance with the duration of the first period.

In a thirteenth aspect of the present invention, based on any of the eighth to twelfth aspects of the invention, the image forming portion includes a thin-film transistor with a control terminal connected to a scanning line in the display portion, a first conductive terminal connected to a signal line in the display portion, a second conductive terminal to which a voltage in accordance with an image to be displayed is applied, the second conductive terminal being connected to a pixel electrode in the display portion, and a channel layer made of an oxide semiconductor.

A fourteenth aspect of the present invention is directed to a method for driving a display device with a display portion including a plurality of image forming portions, a drive portion for driving the display portion, and a control portion for controlling the drive portion, the method comprising:
a video display step of, when a no-refresh period for pausing the refreshing of a screen of the display portion has a duration greater than or equal to a refresh period for refreshing the screen, setting a duration of a first period of a video display period to be less than or equal to a duration of a second period, the video display period being a period in which a video is displayed on the screen, the first period lasting from the start of the refresh period to the start of another refresh period immediately following the refresh period, the second period being a period in which one of a plurality of frame images included in the video is displayable on the screen, wherein,
the video display step includes a refresh rate control step of controlling a refresh rate determined in accordance with the proportion of the refresh period and the no-refresh period.

In a fifteenth aspect of the present invention, based on the fourteenth aspect of the invention, in the refresh rate control step, the refresh rate is changed such that the first period of the video display period is the refresh period.

In a sixteenth aspect of the present invention, based on the fourteenth aspect of the invention, the first period of the video display period includes the refresh period and the no-refresh period.

In a seventeenth aspect of the present invention, based on the sixteenth aspect of the invention, in the refresh rate control step, the duration of the first period of the video display period is set in accordance with the duration of the second period.

In an eighteenth aspect of the present invention, based on the sixteenth aspect of the invention, in the video display step, the duration of the second period of the video display period is set in accordance with the duration of the first period.

Effect of the Invention

In the first aspect of the present invention, in the video display period, the duration of the first period is less than or equal to the duration of the second period. Accordingly, refresh is always performed for each frame image included in the video. As a result, images displayed on the screen during the video display period correspond to the video that should originally be displayed. Thus, it is possible to display a smooth video even when pause drive is performed.

The second aspect of the present invention renders it possible to achieve similar effects to those achieved by the first aspect of the present invention in modes for which the video data generation portion is provided in the control portion. Moreover, the video data is generated from the frame image data representing a predetermined number of frame images, and therefore, it is possible to display a video loop readily.

In the third or ninth aspect of the present invention, refresh is performed constantly in the second period. Thus, it is possible to smoothly display a video consisting of, for example, frame images that switch every frame.

In the fourth or tenth aspect of the present invention, pause drive is performed during the video display period. Accordingly, when the second period lasts for a predetermined duration or more, it is possible to allow images displayed on the screen during the video display period to correspond to the frame images included in the video, without performing constant refresh as in the third or ninth aspect of the invention. Thus, it is possible to further reduce power consumption compared to the third or ninth aspect of the present invention.

In the fifth or eleventh aspect of the present invention, the duration of the first period of the video display period is set in accordance with the duration of the second period, whereby it is possible to achieve similar effects to those achieved by the fourth or tenth aspect of the present invention.

In the sixth or twelfth aspect of the present invention, the duration of the second period of the video display period is set in accordance with the duration of the first period, whereby it is possible to achieve similar effects to those achieved by the fifth or eleventh aspect of the invention. Moreover, it is not necessary to change the refresh rate, and therefore, for example, in the case where drive with a relatively low refresh rate is performed during periods other than the video display period, it is possible to further reduce power consumption compared to the fifth or eleventh aspect of the invention.

In the seventh or thirteenth aspect of the present invention, a thin-film transistor with a channel layer made of an oxide semiconductor is used as the thin-film transistor in the image forming portion. Thus, it is possible to reliably hold a voltage written in the image forming portion. In addition, it is possible to further suppress reduction in display quality.

The eighth aspect of the present invention allows an electronic device including a display device and a video data generation portion to achieve similar effects to those achieved by the first aspect of the invention. Moreover, the video data is generated from the frame image data representing a predetermined number of frame images, and therefore, it is possible to display a video loop readily.

The fourteenth aspect of the present invention allows a display device drive method to achieve similar effects to those achieved by the first aspect of the invention.

The fifteenth aspect of the present invention allows the display device drive method to achieve similar effects to those achieved by the third or ninth aspect of the invention.

The sixteenth aspect of the present invention allows the display device drive method to achieve similar effects to those achieved by the fourth or tenth aspect of the invention.

The seventeenth aspect of the present invention allows the display device drive method to achieve similar effects to those achieved by the fifth or eleventh aspect of the invention.

The eighteenth aspect of the present invention allows the display device drive method to achieve similar effects to those achieved by the sixth or twelfth aspect of the invention.

MODES FOR CARRYING OUT THE INVENTION

Hereinafter, first through fourth embodiments of the present invention will be described with reference to the accompanying drawings. In the following embodiments, "one frame" refers to a frame (16.67 ms) for a general display device with a refresh rate of 60 Hz. Moreover, drive performed at a refresh rate of X Hz (where X>0) will be referred to below as "X-Hz drive". Furthermore, in some cases, to perform screen refresh will be simply referred to below as "to perform refresh".

<1. First Embodiment>
<1.1 Overall Configuration and Summarized Operation>

Figure 1:
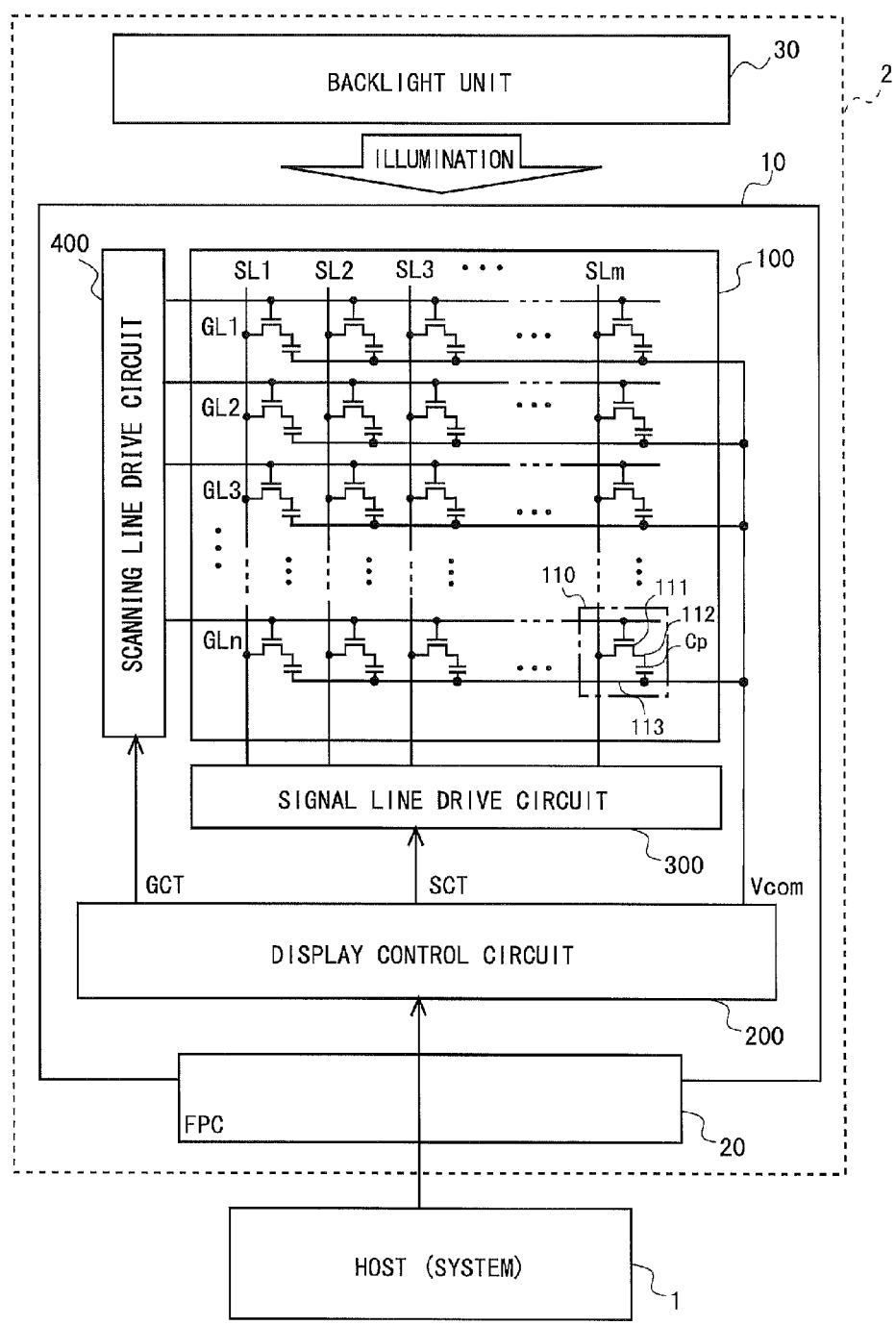
FIG. 1 is a block diagram illustrating the configuration of an electronic device according to a first embodiment of the present invention.

FIG. 1 is a block diagram illustrating the configuration of an electronic device according to the first embodiment of the present invention. This electronic device consists of a host (system) 1 and a liquid crystal display device 2. The host 1 has a CPU as a main component. The liquid crystal display device 2 includes a liquid crystal display panel 10 and a backlight unit 30. The liquid crystal display panel 10 is provided with an FPC (Flexible Printed Circuit) 20 for external connection. In addition, a display portion 100, a display control circuit 200, which acts as a control portion, a signal line drive circuit 300, and a scanning line drive circuit 400 are provided on a substrate of the liquid crystal display panel 10. Note that both or one of the signal line drive circuit 300 and the scanning line drive circuit 400 may be provided in the display control circuit 200. Alternatively, both or one of the signal line drive circuit 300 and the scanning line drive circuit 400 may be integrally formed with the display portion 100.

The display portion 100 has formed thereon a plurality (m) of signal lines SL1 to SLm, a plurality (n) of scanning lines GL1 to GLn, and a plurality (m×n) of image forming portions 110 provided corresponding to the intersections of the m signal lines SL1 to SLm and the n scanning lines GL1 to GLn. In the following, where the m signal lines SL1 to SLm are not distinguished from one another, they will simply be referred to as "signal lines SL", and where the n scanning lines GL1 to GLn are not distinguished from one another, they will simply be referred to as "scanning lines GL". The m×n image forming portions 110 are provided in a matrix. Each image forming portion 110 includes a TFT 111, which has a gate terminal acting as a control terminal and connected to a scanning line GL passing through its corresponding intersection, and a source terminal acting as a first conductive terminal and connected to a signal line SL passing through the intersection, a pixel electrode 112 connected to a drain terminal of the TFT 111, which acts as a second conductive terminal, a common electrode 113 provided commonly for the m×n image forming portions 110, and a liquid crystal layer commonly provided for the m×n image forming portions 110 between the pixel electrode 112 and the common electrode 113. In addition, there is provided pixel capacitance Cp, which is liquid crystal capacitance created by the pixel electrode 112 and the common electrode 113. Note that typically, to reliably hold a voltage in the pixel capacitance Cp, auxiliary capacitance is provided parallel to the liquid crystal capacitance, and therefore, practically, the pixel capacitance Cp includes the liquid crystal capacitance and the auxiliary capacitance.

In the present embodiment, a TFT which uses, for example, an oxide semiconductor for a channel layer (referred to below as an "oxide TFT") is used as the TFT 111. More specifically, the channel layer of the TFT 111 is made with IGZO (InGaZnOx) mainly composed of indium (In), gallium (Ga), zinc (Zn), and oxygen (O). In the following, a TFT which uses IGZO for a channel layer will be referred to as an "IGZO-TFT". The IGZO-TFT has a considerably lower off-leak current than silicon-based TFTs which use amorphous silicon or suchlike for their channel layers. Accordingly, a voltage written in the pixel capacitance Cp can be held for a longer period of time. Note that similar effects can be achieved also in the case where the channel layer is made with an oxide semiconductor other than IGZO, including, for example, at least one of the following: indium, gallium, zinc, copper (Cu), silicon (Si), tin (Sn), aluminum (Al), calcium (Ca), germanium (Ge), and lead (Pb). Moreover, the oxide TFT used as the TFT 111 is merely an illustrative example, and a silicon-based TFT or suchlike can instead be used.

The display control circuit 200 is typically realized as an IC (Integrated Circuit). The display control circuit 200 receives data DAT from the host 1 via the FPC 20, and correspondingly generates and outputs a signal line control signal SCT, a scanning line control signal GCT, and a common potential Vcom. The signal line control signal SCT is provided to the signal line drive circuit 300. The scanning line control signal GCT is provided to the scanning line drive circuit 400. The common potential Vcom is provided to the common electrode 113. In the present embodiment, for example, the data DAT is exchanged between the host 1 and the display control circuit 200 through an interface which supports the DSI (Display Serial Interface) standard proposed by the MIPI (Mobile Industry Processor Interface) Alliance. The interface which supports the DSI standard allows high-speed data transmission. In the present embodiment, the interface which supports the DSI standard is used in video mode or command mode.

In accordance with the signal line control signal SCT, the signal line drive circuit 300 generates and outputs drive video signals to the signal lines SL. The signal line control signal SCT includes, for example, digital video signals corresponding to RGB data RGBD, as well as a source start pulse signal, a source clock signal, and a latch strobe signal. The signal line drive circuit 300 causes its unillustrated internal components, such as a shift register and a sampling latch circuit, to operate in accordance with the source start pulse signal, the source clock signal, and the latch strobe signal, and also causes an unillustrated DA conversion circuit to convert digital signals resulting from the digital video signals into analog signals, thereby generating the drive video signals.

In accordance with the scanning line control signal GCT, the scanning line drive circuit 400 repeats applying active scanning signals to the scanning lines GL in predetermined cycles. The scanning line control signal GCT includes, for example, a gate clock signal and a gate start pulse signal. The scanning line drive circuit 400 causes its unillustrated internal components, such as a shift register, to operate in accordance with the gate clock signal and the gate start pulse signal, thereby generating the scanning signals. The scanning line drive circuit 400, along with the signal line drive circuit 300, functions as a drive portion.

The backlight unit 30 is provided behind the liquid crystal display panel 10, so as to irradiate the back of the liquid crystal display panel 10 with backlight. The backlight unit 30 typically includes a plurality of LEDs (Light Emitting Diodes). The backlight unit 30 may be controlled by the display control circuit 200 or may be controlled by another means. Note that in the case where the liquid crystal display panel 10 is of a reflective type, it is not necessary to provide the backlight unit 30.

In this manner, the backlight unit 30 is driven by applying the drive video signals to the signal lines SL and the scanning signals to the scanning lines, so that the display portion 100 of the liquid crystal display panel 10 displays a screen in accordance with the image data transmitted by the host 1.

<1.2 Configuration of the Display Control Circuit>

In the following, the configuration of the display control circuit 200 will be described with respect to three different modes. The first mode is a video mode for which no RAM (Random Access Memory) is provided. The first mode will be referred to below as a "video mode without RAM". The second mode is a video mode for which RAM is provided. The second mode will be referred to below as a "video mode with RAM capture". The third mode is a command mode for which RAM is provided. The third mode will be referred to below as a "command mode with RAM write". Note that the present invention is not limited by the interface that supports the DSI standard, and the configuration of the display control circuit 200 is not limited by the three modes described herein.

<1.2.1 Video Mode Without RAM>

Figure 2:
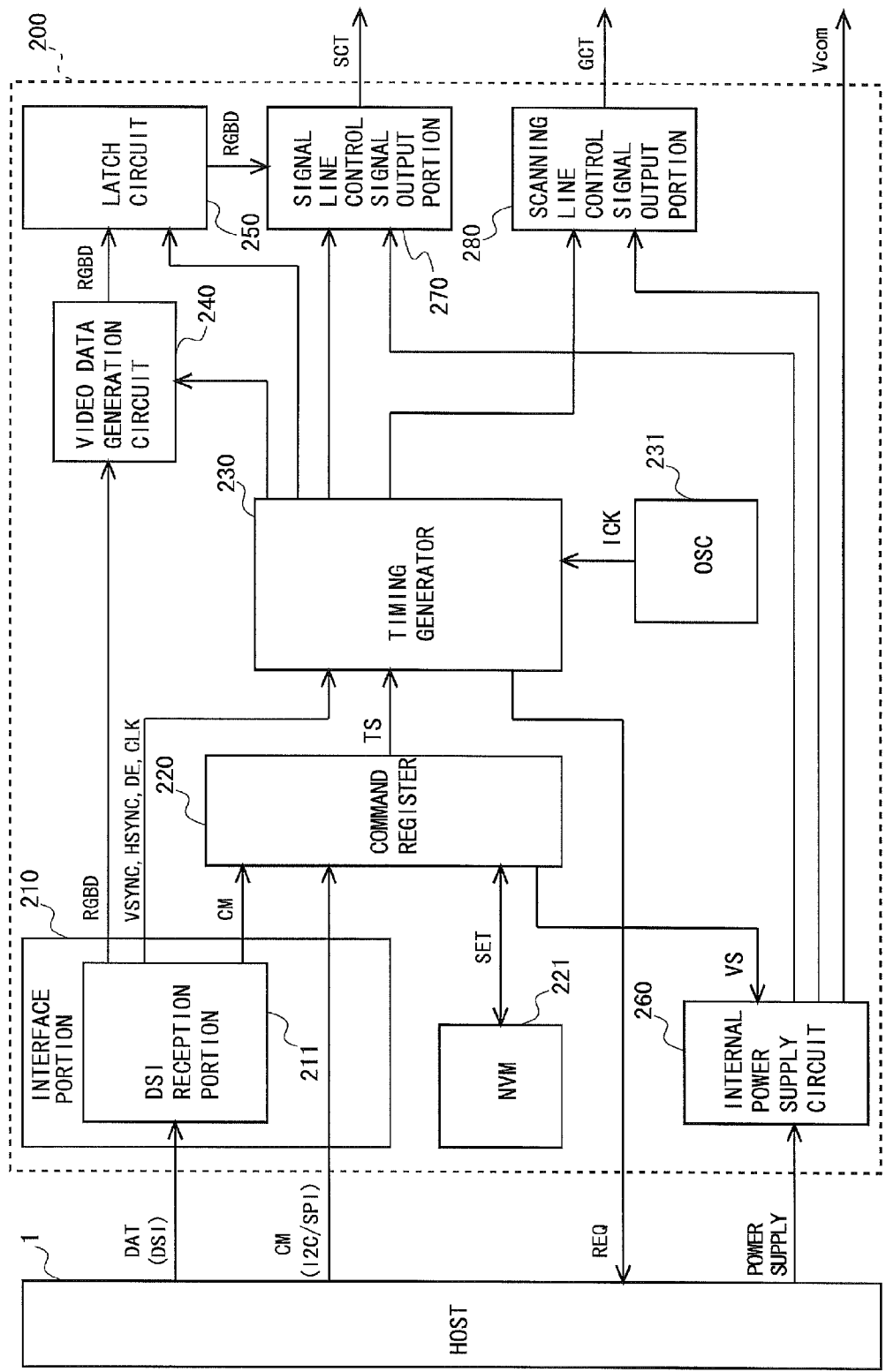
FIG. 2 is a block diagram describing the configuration of a display control circuit supporting the video mode without RAM in the first embodiment.

FIG. 2 is a block diagram describing the configuration of a display control circuit 200 supporting the video mode without RAM (referred to below as the "display control circuit 200 for the video mode without RAM") in the present embodiment. As shown in FIG. 2, the display control circuit 200 includes an interface portion 210, a command register 220, NVM (non-volatile memory) 221, a timing generator 230, an OSC (oscillator) 231, a video data generation circuit 240, a latch circuit 250, an internal power supply circuit 260, a signal line control signal output portion 270, and a scanning line control signal output portion 280. The interface portion 210 includes a DSI reception portion 211. Note that both or one of the signal line drive circuit 300 and the scanning line drive circuit 400 may be provided in the display control circuit 200, as described above.

The DSI reception portion 211 in the interface portion 210 supports the DSI standard. Data DAT for the video mode includes RGB data RGBD, which represents data for an image, synchronization signals, including a vertical synchronization signal VSYNC, a horizontal synchronization signal HSYNC, a data enable signal DE, and a clock signal CLK, and command data CM. The command data CM includes data for a variety of types of control. Upon reception of the data DAT from the host 1, the DSI reception portion 211 transmits the RGB data RGBD included in the data DAT to the video data generation circuit 240, the vertical synchronization signal VSYNC, the horizontal synchronization signal HSYNC, the data enable signal DE, and the clock signal CLK to the timing generator 230, and the command data CM to the command register 220. Note that the command data CM may be transmitted by the host 1 to the command register 220 via an interface which supports the I2C (Inter-Integrated Circuit) standard or the SPI (Serial Peripheral Interface) standard. In such a case, the interface portion 210 includes a reception portion which supports the I2C standard or the SPI standard.

The command register 220 holds the command data CM. The NVM 221 holds setting data SET for a variety of types of control. The command register 220 reads the setting data SET being held in the NVM 221, and updates the setting data SET in accordance with the command data CM. In accordance with the command data CM and the setting data SET, the command register 220 transmits a timing control signal TS to the timing generator 230, and a voltage setting signal VS to the internal power supply circuit 260.

In accordance with the vertical synchronization signal VSYNC, the horizontal synchronization signal HSYNC, the data enable signal DE, the clock signal CLK, and the timing control signal TS, as well as an internal clock signal ICK generated by the OSC 231, the timing generator 230 transmits control signals to control the video data generation circuit 240, the latch circuit 250, the signal line control signal output portion 270, and the scanning line control signal output portion 280. Further, in accordance with the vertical synchronization signal VSYNC, the horizontal synchronization signal HSYNC, the data enable signal DE, the clock signal CLK, and the timing control signal TS, the timing generator 230 generates a request signal REQ on the basis of the internal clock signal ICK generated by the OSC 231, and transmits the request signal REQ to the host 1. The request signal REQ is a signal to request the host 1 to transmit data DAT. Note that the OSC 231 is dispensable for the display control circuit 200 for the video mode without RAM.

The video data generation circuit 240 is a circuit for realizing the animation function and/or the rotation function. The video data generation circuit 240, under control of the timing generator 230, generates video data representing an animation video from frame image data representing frame images, each being an image for one frame. The frame image data may be acquired by receiving RGB data RGBD from the interface portion 210, or may be prestored in the video data generation circuit 240. Moreover, video data may be generated from frame image data for a plurality of frames. To display an animation video, frame image data representing the frame images that constitute the animation video is sequentially transmitted in units of a predetermined number of frames to the latch circuit 250 as RGB data RGBD. To display animation still images, frame image data representing the same type of frame images continues to be transmitted to the latch circuit 250 as RGB data RGBD. Here, the frame image data transmitted to the latch circuit 250 as RGB data RGBD in order to display animation still images may be acquired by receiving RGB data RGBD from the interface portion 210, may be prestored in the video data generation circuit 240, or may be generated from prestored frame image data. With the video data generation method as described above, it is possible to display a video loop readily without receiving image data externally. Note that the video data generation method is not limited by the examples described herein, and various other methods can be employed. The same applies to generation of video data representing a rotation video.

The latch circuit 250, under control of the timing generator 230, transmits the RGB data RGBD for one line to the signal line control signal output portion 270.

On the basis of power supplied by the host 1 and in accordance with the voltage setting signal VS provided by the command register, the internal power supply circuit 260 generates and outputs a common potential Vcom as well as power supply voltages to be used by the signal line control signal output portion 270 and the scanning line control signal output portion 280.

On the basis of the RGB data RGBD from the latch circuit 250, the control signal from the timing generator 230, and the power supply voltage from the internal power supply circuit 260, the signal line control signal output portion 270 generates and outputs a signal line control signal SCT to the signal line drive circuit 300.

On the basis of the control signal from the timing generator 230 and the power supply voltage from the internal power supply circuit 260, the scanning line control signal output portion 280 generates and outputs a scanning line control signal GCT to the scanning line drive circuit 400.

<1.2.2 Video Mode With RAM Capture>

Figure 3:
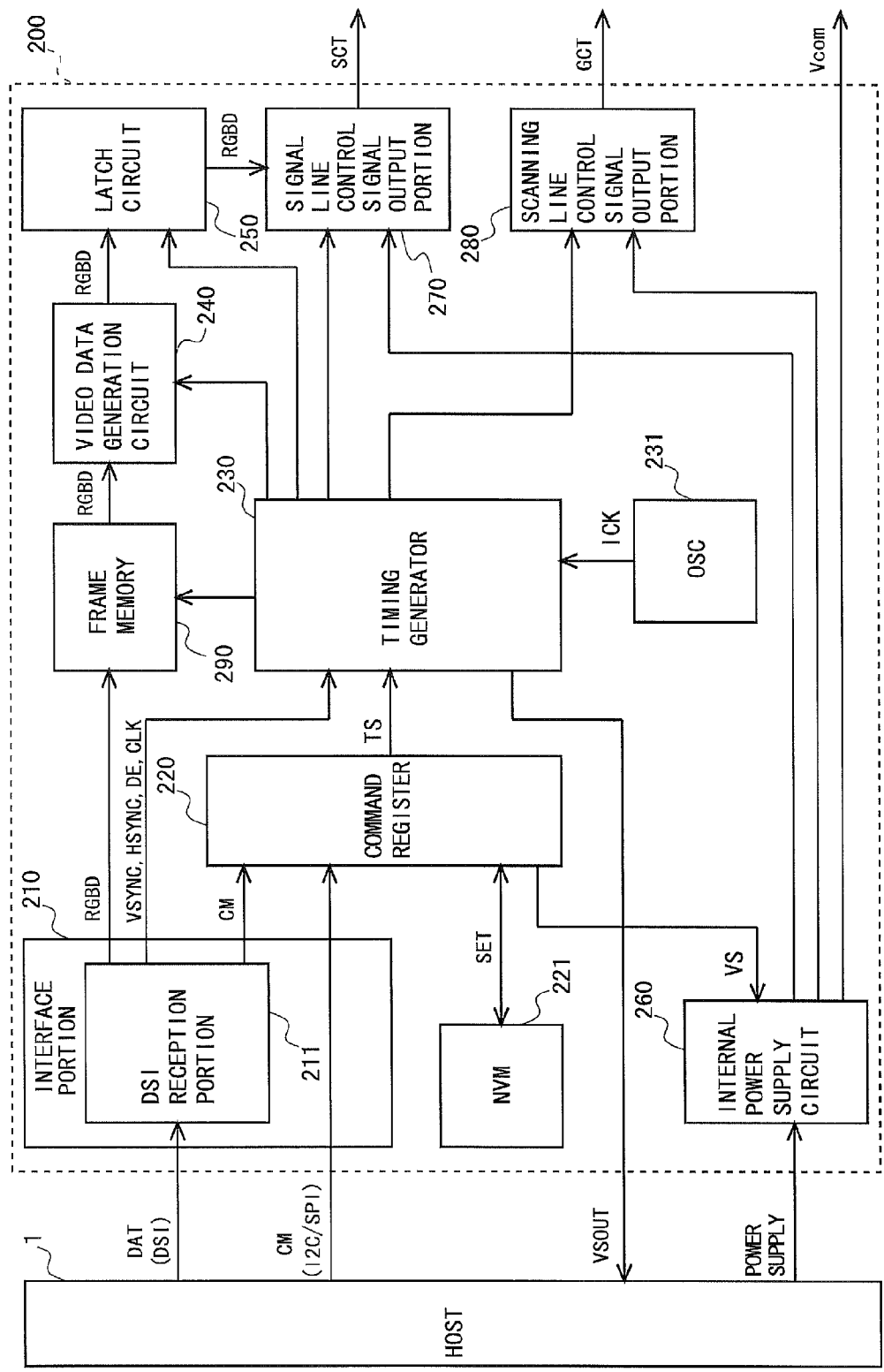
FIG. 3 is a block diagram describing the configuration of a display control circuit supporting the video mode with RAM capture in the first embodiment.

FIG. 3 is a block diagram describing the configuration of a display control circuit 200 supporting the video mode with RAM capture (referred to below as the "display control circuit 200 for the video mode with RAM capture") in the present embodiment. As shown in FIG. 3, the display control circuit 200 for the video mode with RAM capture is obtained by adding frame memory (RAM) 290 to the display control circuit 200 for the video mode without RAM.

In the display control circuit 200 for the video mode without RAM, the DSI reception portion 211 transmits the RGB data RGBD directly to the video data generation circuit 240, but in the display control circuit 200 for the video mode with RAM capture, the RGB data RGBD transmitted by the DSI reception portion 211 is held in the frame memory 290. The video data generation circuit 240 reads the RGB data RGBD (frame image data) being held in the frame memory 290 in accordance with a control signal generated by the timing generator 230. The video data generation circuit 240 performs the process of generating video data as described above on the basis of the frame image data being read from the frame memory 290. Moreover, the timing generator 230 transmits a vertical synchronization output signal VSOUT to the host 1, instead of the request signal REQ. The vertical synchronization output signal VSOUT is a signal to control the timing of the host 1 transmitting the data DAT such that the timing of the RGB data RGBD being written to the frame memory 290 does not overlap the timing of the RGB data RGBD being read from the frame memory 290. Other features and operations of the display control circuit 200 for the video mode with RAM capture are the same as those of the display control circuit 200 for the video mode without RAM, and therefore, any descriptions thereof will be omitted. Note that the OSC 231 is dispensable for the display control circuit 200 for the video mode with RAM capture.

In the display control circuit 200 for the video mode with RAM capture, the frame memory 290 is capable of holding the RGB data RGBD. Therefore, the host 1 is not required to transmit data DAT to the display control circuit 200 more than once when the screen is not updated.

<1.2.3 Command Mode With RAM Write>

Figure 4:
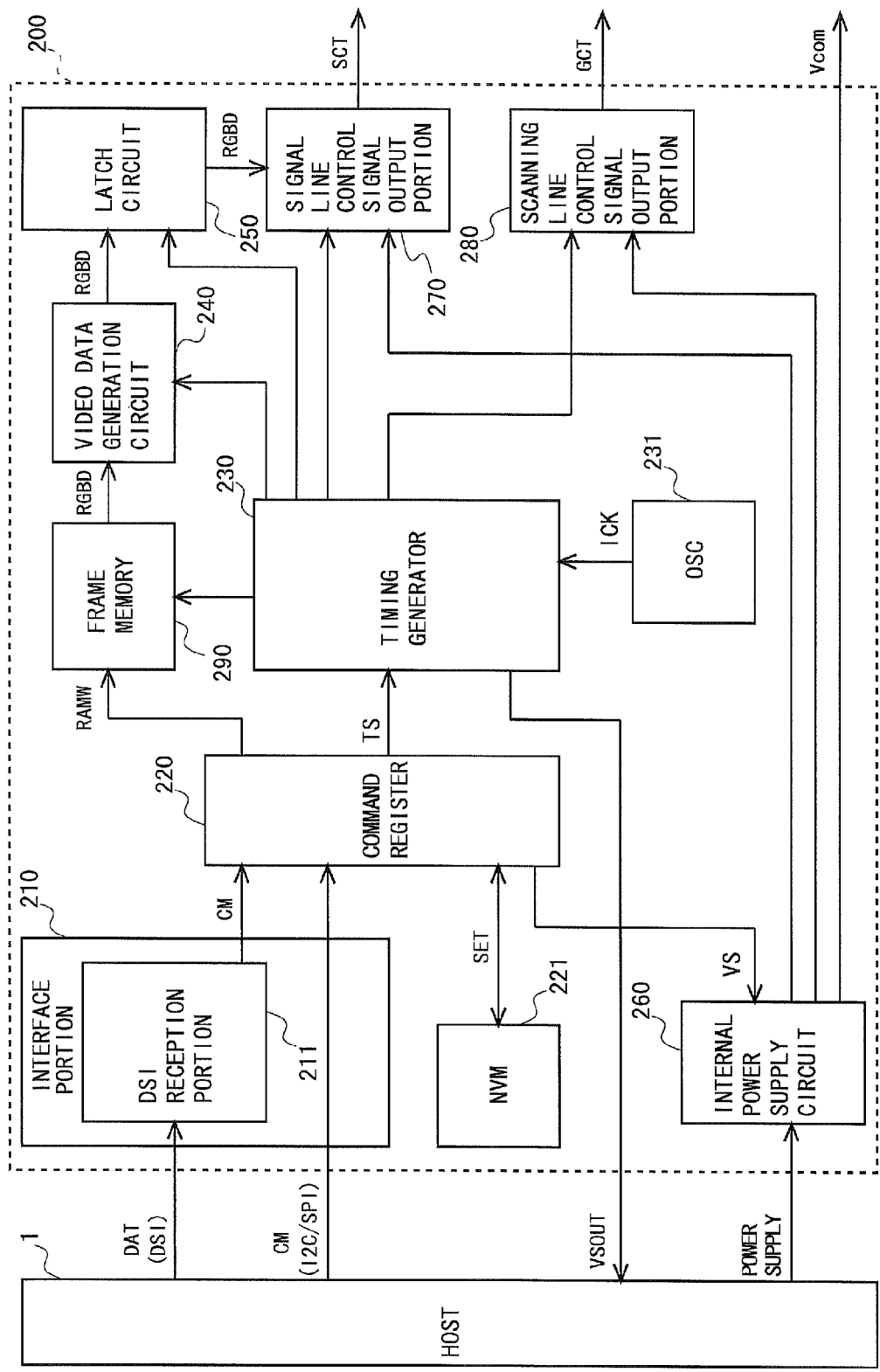
FIG. 4 is a block diagram describing the configuration of a display control circuit supporting the command mode with RAM write in the first embodiment.

FIG. 4 is a block diagram describing the configuration of a display control circuit 200 supporting the command mode with RAM write (referred to below as the "display control circuit 200 for the command mode with RAM write") in the present embodiment. The display control circuit 200 for the command mode with RAM write has the same configuration as the display control circuit 200 for the video mode with RAM capture, except that the data DAT includes different types of data, as shown in FIG. 4.

The data DAT for the command mode includes command data CM, but it does not include any of the following: the RGB data RGBD, the vertical synchronization signal VSYNC, the horizontal synchronization signal HSYNC, the data enable signal DE, and the clock signal CLK. However, the command data CM for the command mode includes data for an image and data for various timings. Among the command data CM, the command register 220 transmits a RAM write signal RAMW, which corresponds to data for an image, to the frame memory 290. The RAM write signal RAMW corresponds to the RGB data RGBD described above. Moreover, for the command mode, the timing generator 230 does not receive the vertical synchronization signal VSYNC and the horizontal synchronization signal HSYNC, and therefore, an internal vertical synchronization signal IVSYNC and an internal horizontal synchronization signal IHSYNC, which correspond to such signals, are internally generated in accordance with an internal clock signal ICK and a timing control signal TS. In accordance with the internal vertical synchronization signal IVSYNC and the internal horizontal synchronization signal IHSYNC, the timing generator 230 controls the video data generation circuit 240, the latch circuit 250, the signal line control signal output portion 270, the scanning line control signal output portion 280, and the frame memory 290. Moreover, the timing generator 230 transmits a transmission control signal TE, which corresponds to the vertical synchronization output signal VSOUT, to the host 1.

<1.3 Operations>

Figure 5:
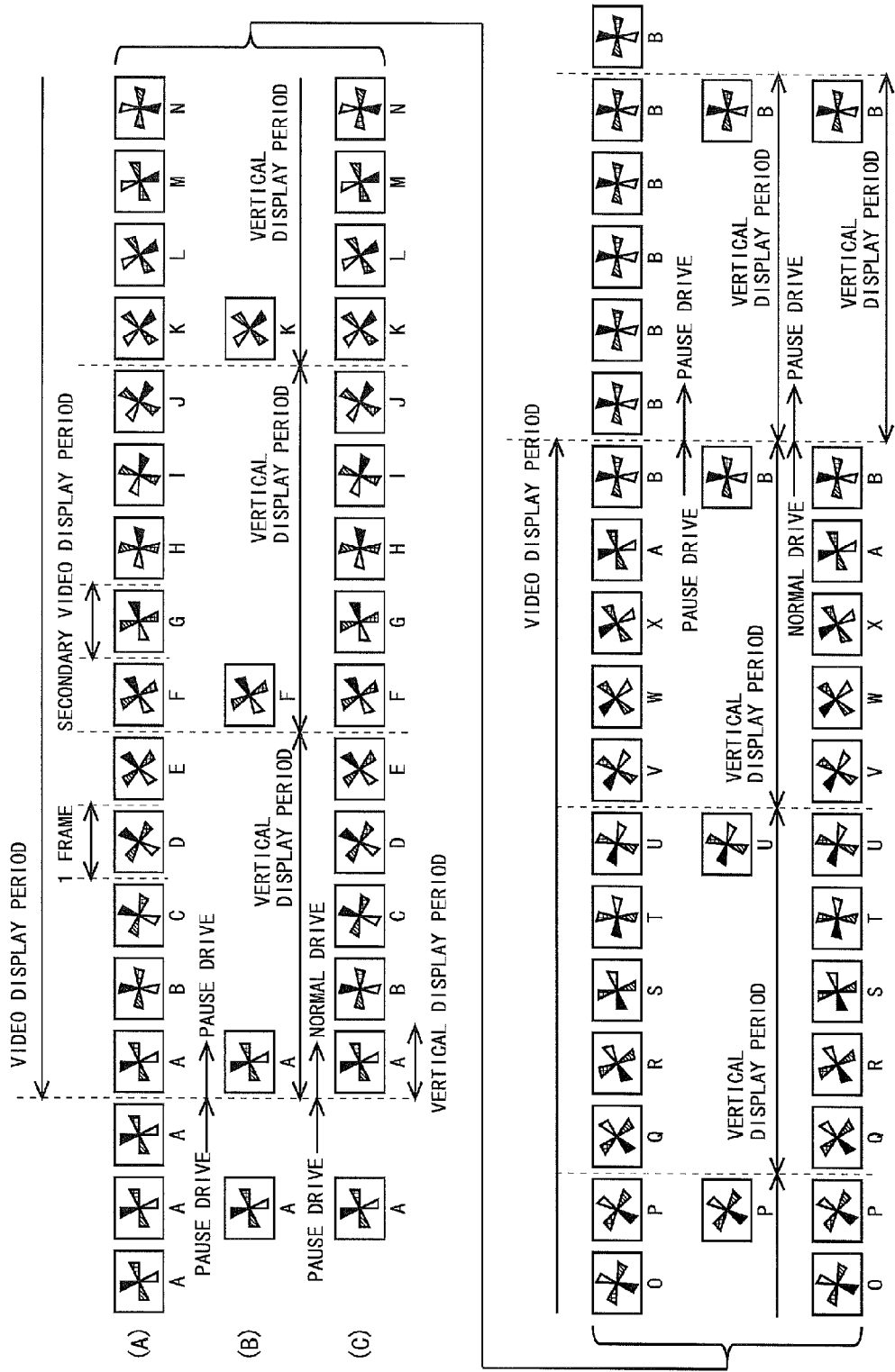
FIG. 5 is a diagram describing an operational example of a liquid crystal display device in the first embodiment where part (A) shows animation images, part (B) shows refresh images on a conventional liquid crystal display device, and part (C) shows refresh images in the first embodiment.

FIG. 5 is a diagram describing an operational example of the liquid crystal display device 2 in the present embodiment.

Figure 13:
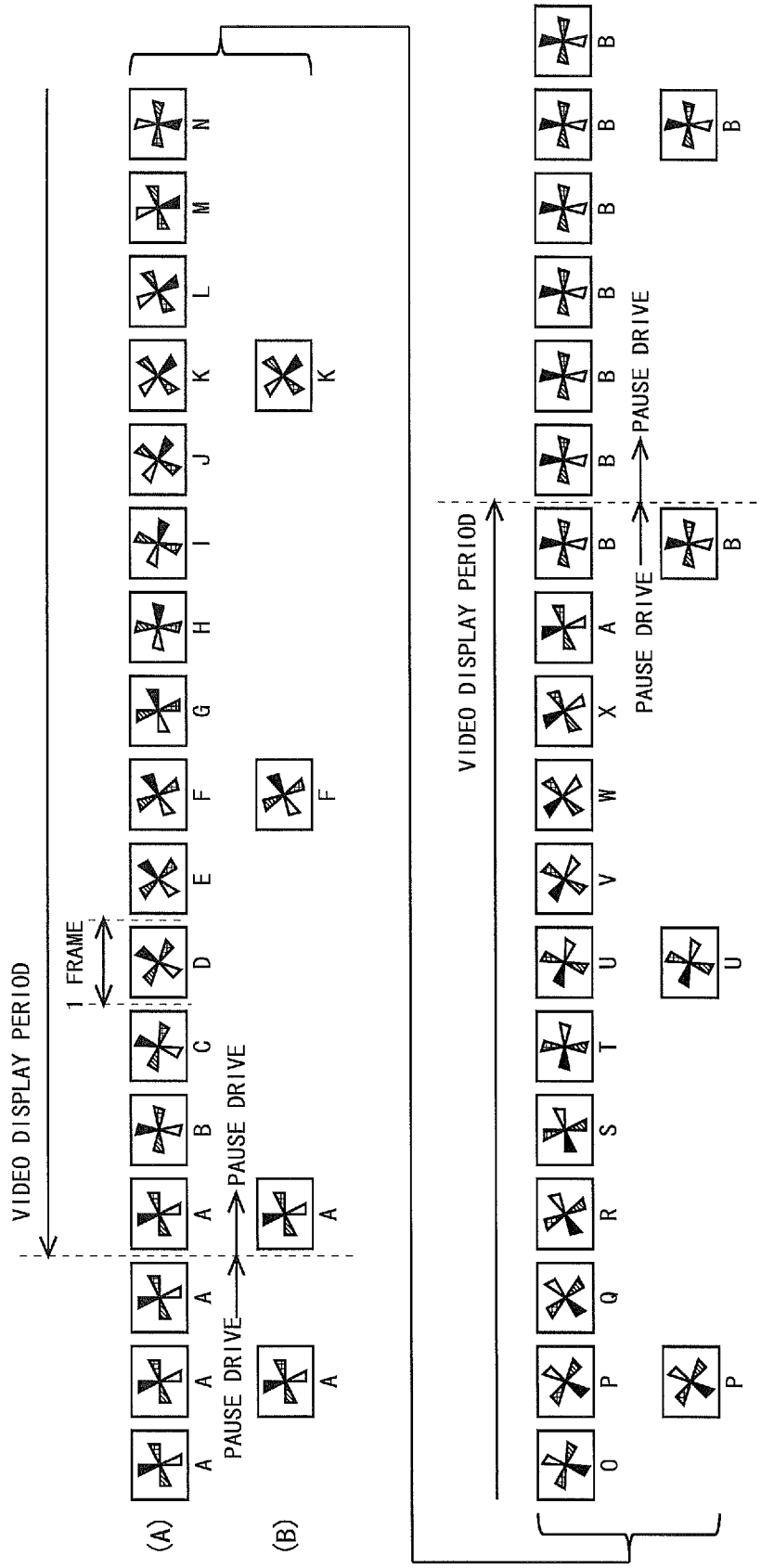
FIG. 13 is a diagram describing the operation of the conventional liquid crystal display device with the animation function where part (A) shows animation images, part (B) shows refresh images on the conventional liquid crystal display device.

FIG. 5(A) shows animation images (windmill), and corresponds to FIG. 13(A) described earlier. As shown in FIG. 5(A), the duration of a video display period is 26 frames. The animation video shows a rotating windmill. FIG. 5(B) shows refresh images on a conventional liquid crystal display device, and corresponds to FIG. 13(B) described earlier. FIG. 5(C) shows refresh images in the present embodiment. In the example shown in FIG. 5(C), there are two types of drive, i.e., pause drive, which is drive at less than 60 Hz (e.g., 12 Hz), and normal drive, which is 60-Hz drive. The operations to be described below are basically the same for all of the video mode without RAM, the video mode with RAM capture, and the command mode with RAM write.

Here, the normal drive herein refers to drive for refreshing the screen every frame. Moreover, the pause drive herein refers to drive in which a predetermined number of refresh frames are followed by a predetermined number of no-refresh frames, and the refresh and no-refresh frames are repeated alternatingly. In FIGS. 5(A) to 5(C), each rectangular box represents one frame (the same applies to FIGS. 6(A) to 6(C), 7(A) to 7(C), 8(A) to 8(C), and 9(A) to 9(D) to be described later). As shown in FIG. 5(A), prior to the video display period, the animation still image is image A, and during the video display period, the animation video sequentially changes every frame in the order: images A to X, then A and B, so that the animation still image after the video display period is image B. The rectangular boxes shown in FIGS. 5(B) and 5(C) represent refresh frames, and the frames other than the refresh frames (where no rectangular boxes are shown) represent no-refresh frames (the same applies to FIGS. 7(B), 7(C), 8(B), 8(C), 9(B), and 9(D) to be described later). Note that in the present embodiment, polarity inversion drive (alternating-current drive) is performed, so that the polarity of a potential written to pixel capacitance Cp is inverted, for example, upon each refresh. Thus, the polarity balance of the liquid crystal voltage can be attained, so that deterioration of the liquid crystal can be suppressed.

Herein, a first period, which is a period from the start of a refresh frame up to the start of another refresh frame immediately following the refresh frame, will be referred to as a "vertical display period". Also, a second period, which is a period within the video display period in which a frame image included in an animation video or a rotation video can be displayed (more specifically, the frame image is displayed on the screen if refresh is performed), will be referred to as a "secondary video display period". The duration of each of the vertical display period and the secondary video display period is given in the number of frames.

In the refresh frame, screen refresh is performed, as described above. More specifically, the signal line drive circuit 300 supplies drive video signals to the signal lines SL1 to SLm in accordance with a signal line control signal SCT including digital video signals which correspond to RGB data RGBD, and the scanning line drive circuit 400 scans (i.e., sequentially selects) the scanning lines GL1 to GLn in accordance with a scanning line control signal GCT. The TFTs 111 corresponding to the selected scanning lines GL are turned on, so that the voltages of the drive video signals are written in pixel capacitance Cp. In this manner, the screen is refreshed. Thereafter, the TFTs 111 are turned off, and the written voltages, i.e., liquid crystal voltages, are held until the next screen refresh.

In the no-refresh frame, screen refresh is paused, as described above. More specifically, the supplying of the scanning line control signal GCT to the scanning line drive circuit 400 is stopped, or the scanning line control signal GCT is set at a constant potential, whereby the scanning line drive circuit 400 is stopped from operating, so that the scanning lines GL1 to GLn are not scanned. That is, in the no-refresh frame, the voltages of the drive video signals are not written in pixel capacitance Cp. However, the liquid crystal voltages are held, as described above, and therefore, the screen having been refreshed in the immediately preceding refresh frame continues to be displayed. Further, in the no-refresh frame, the supplying of the signal line control signal SCT to the signal line drive circuit 300 is stopped, or the signal line control signal SCT is set at a constant potential, whereby the signal line drive circuit 300 is stopped from operating. In this manner, in the no-refresh frame, the scanning line drive circuit 400 and the signal line drive circuit 300 are stopped from operating, resulting in reduced power consumption. However, the signal line drive circuit 300 may continue to operate. In such a case, it is desirable to output predetermined constant potentials as drive video signals.

Here, frame configuration examples for exemplary refresh rates provided herein will be described. In the case where the refresh rate is 60 Hz, refresh frames are repeated and are not followed by a no-refresh frame. In the case where the refresh rate is 60 Hz, one vertical display period lasts for one frame. In the case where the refresh rate is 15 Hz, one refresh frame is immediately followed by three no-refresh frames. In the case where the refresh rate is 15 Hz, one vertical display period lasts for four frames. In the case where the refresh rate is 12 Hz, one refresh frame is immediately followed by four no-refresh frames. In the case where the refresh rate is 12 Hz, one vertical display period lasts for five frames. In the case where the refresh rate is 10 Hz, one refresh frame is immediately followed by five no-refresh frames. In the case where the refresh rate is 10 Hz, one vertical display period lasts for six frames. In the case where the refresh rate is 8.6 Hz, one refresh frame is immediately followed by six no-refresh frames. In the case where the refresh rate is 8.6 Hz, one vertical display period lasts for seven frames. As the refresh rate decreases, the proportion of no-refresh frames increases, so that the amount of reduction in power consumption increases.

Data for the numbers of refresh frames and no-refresh frames for each refresh rate (referred to below as "rate data") is included in, for example, command data CM. A timing control signal TS corresponding to rate data is transmitted to the timing generator 230, and drive is performed in accordance with the refresh rate. In this manner, the timing generator 230 functions as a refresh rate control portion. Switching between refresh rates is performed by, for example, rate data for the refresh rate after the switching being transmitted to the command register 220 by the host 1, updating the rate data being held in the command register 220. The timing generator 230 is capable of, for example, transmitting a control signal to the host 1, thereby causing the host 1 to transmit such new rate data.

First, the operation prior to the video display period will be described. Before the video display period, an animation image in each frame is image A, as shown in FIG. 5(A). In this case, in both the conventional liquid crystal display device and the liquid crystal display device 2 of the present embodiment, 12-Hz pause drive is performed, so that image A, which is an animation still image, is displayed on the screen.

Next, the operation during the video display period will be described. Once the video display period starts, the frame images that constitute the animation video are switched every frame, as shown in FIG. 5(A). That is, the duration of a secondary video display period is one frame. For such an animation video, the conventional liquid crystal display device continues 12-Hz pause drive, as shown in FIG. 5(B).

Note that the timing of refresh is off before or after the start of animation such that refresh is performed in the first frame of the video display period, but this is not requisite (the same applies to the following descriptions related to the present embodiment). During 12-Hz pause drive, the duration of a vertical display period is five frames. In such a case, for the animation video which changes every duration of the secondary video display period, i.e., every frame, in the order: images A to X, then A and B, refresh is performed every duration of the vertical display period, i.e., every five frames. Accordingly, although the animation video should be displayed on the screen in the order: images A to X, then A and B, refresh is not performed for some of the images. As a result, the animation video is displayed on the screen in the order: images A, F, K, P, U, and B, as shown in FIG. 5(B). Therefore, the animation video does not change smoothly during the video display period.

However, in the present embodiment, once the video display period starts, 12-Hz pause drive switches to 60-Hz normal drive, as shown in FIG. 5(C). During 60-Hz normal drive, the duration of the vertical display period is one frame. In such a case, for the animation video which changes every duration of the secondary video display period, i.e., every frame, in the order: images A to X, then A and B, refresh is performed every duration of the vertical display period, i.e., every frame. In this manner, the duration of the vertical display period is set to be the same as the duration of the secondary video display period, so that refresh is performed individually for images A to X, A, and B included in the animation video. Accordingly, images A to X, A, and B included in the animation video are all displayed on the screen. Note that 12-Hz pause drive starts again after the video display period, and image B displayed on the screen at the end of the video display period continues to be displayed.

Figure 6:
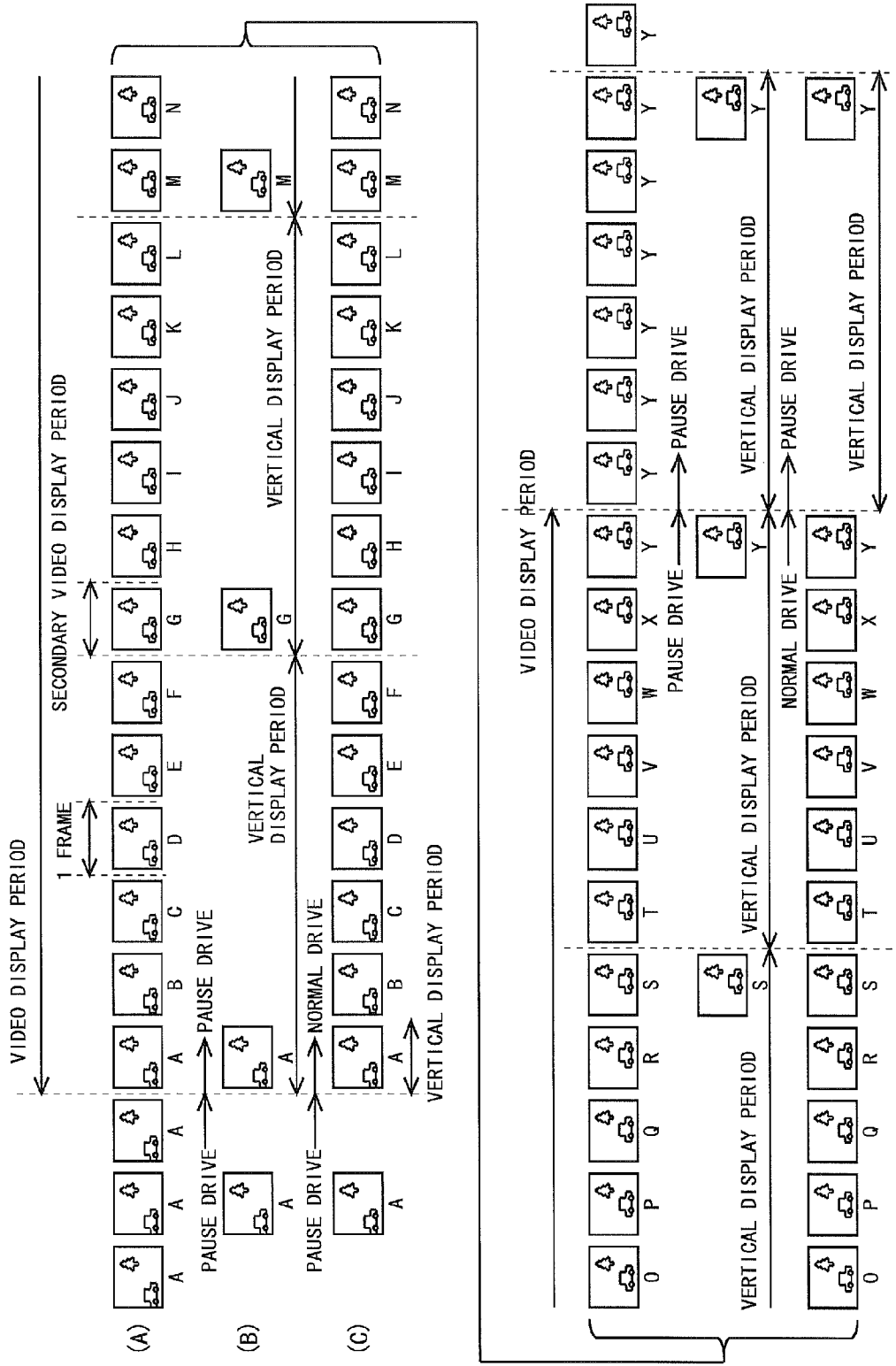
FIG. 6 is a diagram describing another operational example of the liquid crystal display device in the first embodiment where part (A) shows animation images, part (B) shows refresh images on a conventional liquid crystal display device, and part (C) shows refresh images in the first embodiment.

FIG. 6 is a diagram describing another operational example of the liquid crystal display device 2 in the present embodiment. FIG. 6(A) shows animation images (car and tree). The duration of the video display period is 25 frames, as shown in FIG. 6(A). The animation video shows a car moving from left to right in the figure. FIG. 6(B) shows refresh images on a conventional liquid crystal display device. FIG. 6(C) shows refresh images in the present embodiment. In the example shown in FIG. 6(C), two types of drive, i.e., 10-Hz pause drive and 60-Hz normal drive, are performed.

First, the operation prior to the video display period will be described. Before the video display period, an animation image in each frame is image A, as shown in FIG. 6(A). In this case, in both the conventional liquid crystal display device and the liquid crystal display device 2 of the present embodiment, 10-Hz pause drive is performed, so that image A, which is an animation still image, is displayed on the screen.

Next, the operation during the video display period will be described. Once the video display period starts, the frame images that constitute the animation video are switched every frame, as shown in FIG. 6(A). That is, the duration of the secondary video display period is one frame. For such an animation video, the conventional liquid crystal display device continues 10-Hz pause drive, as shown in FIG. 6(B). During 10-Hz pause drive, the duration of the vertical display period is six frames. In such a case, for the animation video which changes every duration of the secondary video display period, i.e., every frame, in the order: images A to Y, refresh is performed every duration of the vertical display period, i.e., every six frames. Accordingly, although the animation video should be displayed on the screen in the order: images A to Y, refresh is not performed for some of the images. As a result, the animation video is displayed on the screen in the order:

images A, G, M, S, and Y, as shown in FIG. 6(B). Therefore, the animation video does not change smoothly during the video display period.

However, in the present embodiment, once the video display period starts, 10-Hz pause drive switches to 60-Hz normal drive, as shown in FIG. 6(C). During 60-Hz normal drive, the duration of the vertical display period is one frame. In such a case, for the animation video which changes every duration of the secondary video display period, i.e., every frame, in the order: images A to Y, refresh is performed every duration of the vertical display period, i.e., every frame. In this manner, the duration of the vertical display period is set to be the same as the duration of the secondary video display period, so that refresh is performed individually for images A to Y included in the animation video. Accordingly, images A to Y included in the animation video are all displayed on the screen. Note that 10-Hz pause drive starts again after the video display period, and image Y displayed on the screen at the end of the video display period continues to be displayed.

Figure 7:
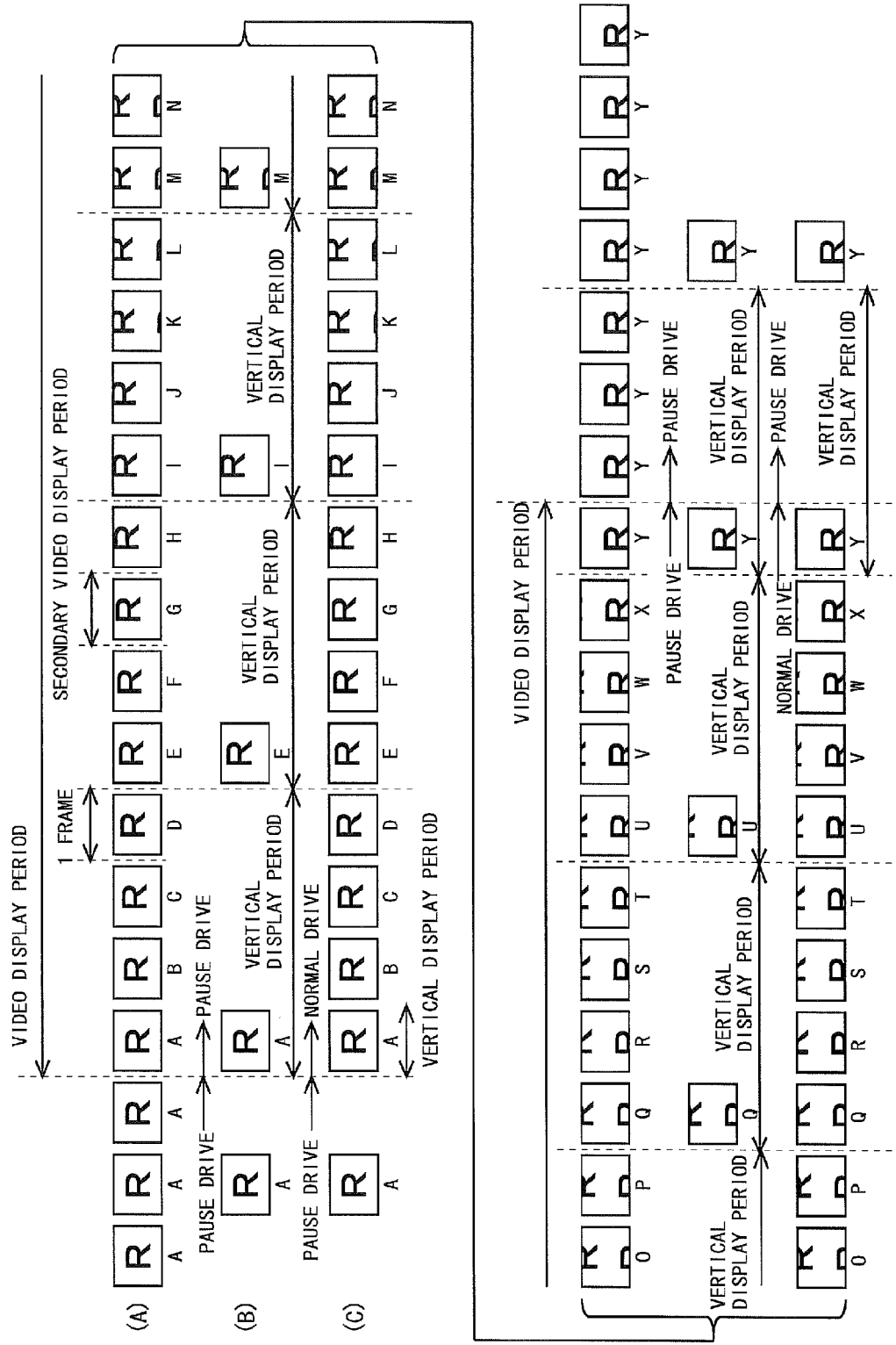
FIG. 7 is a diagram describing another operational example of the liquid crystal display device in the first embodiment where part (A) shows rotation images, part (B) shows refresh images on a conventional liquid crystal display device, and part (C) shows refresh images in the first embodiment.

FIG. 7 is a diagram describing another operational example of the liquid crystal display device 2 in the present embodiment. FIG. 7(A) shows rotation images (letter R). In a rotation video, the letter R is shown as moving repetitively from bottom to top in the figure. The duration of the video display period is 25 frames, as shown in FIG. 7(A). FIG. 7(B) shows refresh images on a conventional liquid crystal display device. FIG. 7(C) shows refresh images in the present embodiment. In the example shown in FIG. 7(C), two types of drive, i.e., 15-Hz pause drive and 60-Hz normal drive, are performed.

First, the operation prior to the video display period will be described. Before the video display period, a rotation image in each frame is image A, as shown in FIG. 7(A). In this case, in both the conventional liquid crystal display device and the liquid crystal display device 2 of the present embodiment, 15-Hz pause drive is performed, so that image A, which is a rotation image, is displayed on the screen.

Next, the operation during the video display period will be described. Once the video display period starts, the frame images that constitute the rotation video are switched every frame, as shown in FIG. 7(A). That is, the duration of the secondary video display period is one frame. For such a rotation video, the conventional liquid crystal display device continues 15-Hz pause drive, as shown in FIG. 7(B). During 15-Hz pause drive, the duration of the vertical display period is four frames. In such a case, for the rotation video which changes every duration of the secondary video display period, i.e., every frame, in the order: images A to Y, refresh is performed every duration of the vertical display period, i.e., every four frames. Accordingly, although the rotation video should be displayed on the screen in the order: images A to Y, refresh is not performed for some of the images. As a result, the rotation video is displayed on the screen in the order: images A, E, I, M, Q, U, and Y, as shown in FIG. 7(B). Therefore, the rotation video does not change smoothly during the video display period.

However, once the video display period starts, 15-Hz pause drive switches to 60-Hz normal drive, as shown in FIG. 7(C). During 60-Hz normal drive, the duration of the vertical display period is one frame. In such a case, for the rotation video which changes every duration of the secondary video display period, i.e., every frame, in the order: images A to Y, refresh is performed every duration of the vertical display period, i.e., every frame. In this manner, the duration of the vertical display period is set to be the same as the duration of the secondary video display period, so that refresh is performed individually for images A to Y included in the rotation video. Accordingly, images A to Y included in the rotation video are all displayed on the screen. Note that 15-Hz pause drive starts again after the video display period, and image B displayed on the screen at the end of the video display period continues to be displayed.

<1.4 Effects>

In the present embodiment, in the video display period, the duration of the vertical display period is the same as the duration of the secondary video display period. Accordingly, during the video display period, each of the animation still images that constitute an animation video is always refreshed. As a result, in the video display period, images displayed on the screen correspond to the animation video that should originally be displayed. Thus, even when pause drive is performed, it is possible to display an animation video smoothly. Note that the same applies to a rotation video.

Furthermore, in the present embodiment, 60-Hz normal drive is performed during the video display period, so that an animation video consisting of frame images that are switched every frame can be displayed smoothly. Note that the same applies to a rotation video.

Furthermore, in the present embodiment, an IGZO-TFT is used as the TFT 111 in the image forming portion 110, the voltage written in pixel capacitance Cp can be held reliably. Thus, it is possible to further suppress reduction in display quality, particularly, during pause drive.

<2. Second Embodiment>
<2.1 Operations>

Figure 8:
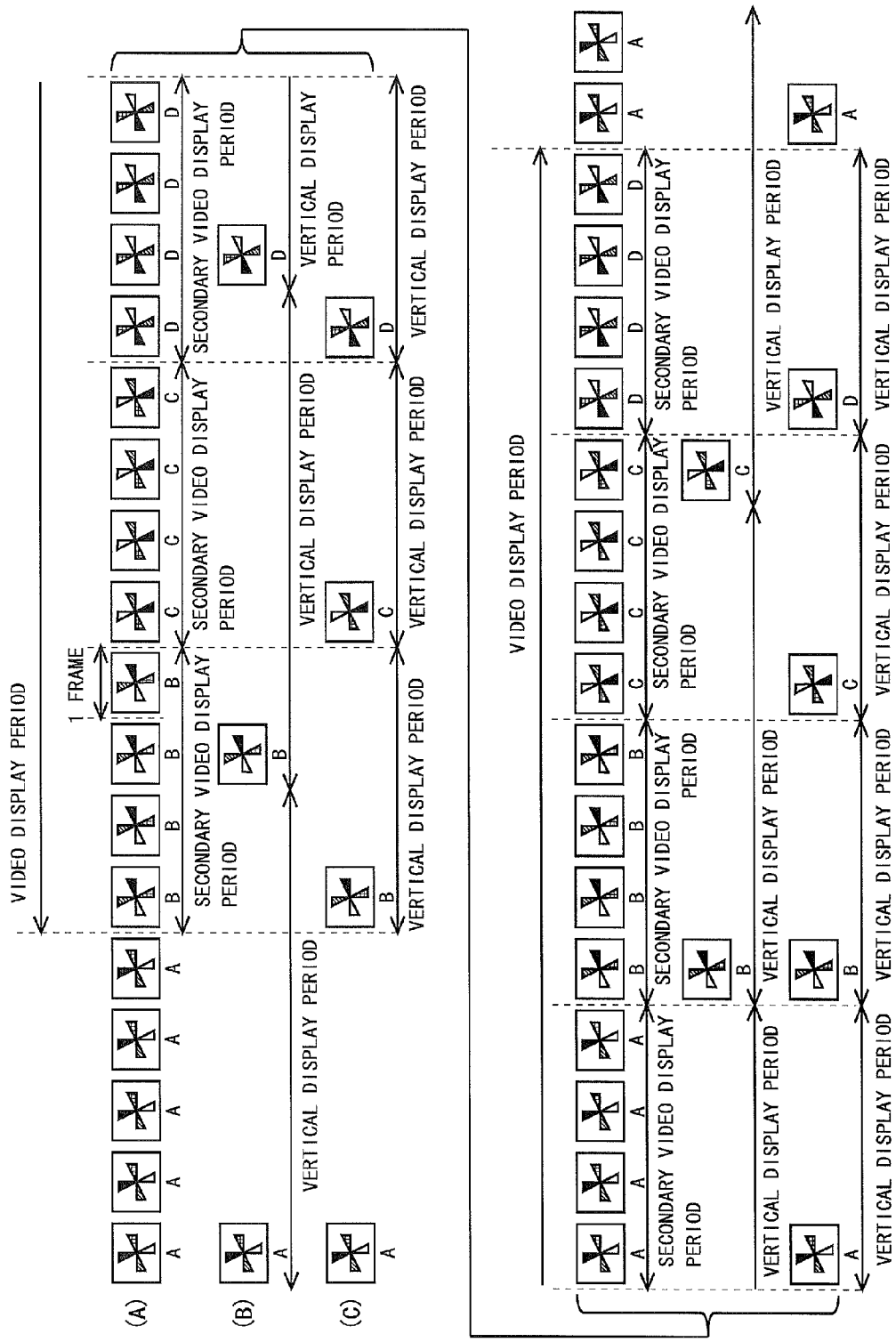
FIG. 8 is a diagram describing an operational example of a liquid crystal display device in a second embodiment of the present invention where part (A) shows animation images, part (B) shows refresh images on a conventional liquid crystal display device, and part (C) shows refresh images in the second embodiment.

FIG. 8 is a diagram describing an operational example of a liquid crystal display device 2 in a second embodiment of the present invention. FIG. 8(A) shows animation images (windmill). As shown in FIG. 8(A), the duration of the video display period is 28 frames. FIG. 8(B) shows refresh images on a conventional liquid crystal display device. FIG. 8(C) shows refresh images in the present embodiment. In the example shown in FIG. 8(C), two types of drive, i.e., 8.6-Hz pause drive and 60-Hz normal drive, are performed. Note that the present embodiment is basically the same as the first embodiment except for operations, and therefore, any descriptions of their common points will be omitted. In the present embodiment, unlike in the first embodiment, the duration of the vertical display period is four frames.

The operation prior to the video display period will be described. Before the video display period, an animation image in each frame is image A, as shown in FIG. 8(A). In this case, in both the conventional liquid crystal display device and the liquid crystal display device 2 of the present embodiment, 8.6-Hz pause drive is performed, so that image A, which is an animation still image, is displayed on the screen.

Next, the operation during the video display period will be described. Once the video display period starts, the frame images that constitute the animation video are switched every four frames, in the order: images B to D, then A to D. That is, the duration of the video display period is four frames. For such an animation video, the conventional liquid crystal display device continues 8.6-Hz pause drive, as shown in FIG. 8(B). During 8.6-Hz pause drive, the duration of the vertical display period is seven frames. In such a case, for the animation video which changes every duration of the secondary video display period, i.e., every four frames, in the order: images B to D, then A to D, refresh is performed every duration of the vertical display period, i.e., every seven frames. Accordingly, although the animation video should be displayed on the screen in the order: images B to D, then A to D, refresh is not performed for some of the images. As a result, the animation video is displayed on the screen in the order: images B, D, B, and C, as shown in FIG. 8(B). Therefore, the animation video does not change smoothly during the video display period. Note that a similar problem occurs even in the case where the timing of refresh is off before or after the start of animation such that refresh is performed in the first frame of the video display period, as in the operational example of the conventional liquid crystal display device provided in conjunction with the descriptions of the first embodiment.

On the other hand, in the present embodiment, once the video display period starts, 8.6-Hz pause drive switches to 15-Hz pause drive, as shown in FIG. 8(C). During 15-Hz pause drive, the duration of the vertical display period is four frames. In such a case, for the animation video which changes every duration of the secondary video display period, i.e., every four frames, in the order: images B to D, then A to D, refresh is performed every duration of the vertical display period, i.e., every four frames. In this manner, the duration of the vertical display period is set to be the same as the duration of the secondary video display period, so that refresh is performed individually for images B to D and A to D included in the animation video. Images B to D and A to D included in the animation video are all displayed on the screen. After the video display period, 8.6-Hz pause drive starts again, with image A as an animation image in each frame, so that following the first refresh after the video display period, image A continues to be displayed on the screen. Here, the first frame of the secondary video display period is the refresh frame, but the present invention is not limited to this.

The present embodiment is not limited by the examples shown in FIGS. 8(A) and 8(C). For example, if the duration of the secondary video display period is five frames, switching to 12-Hz pause drive occurs in the video display period, meaning that the duration of the vertical display period changes to five frames. Moreover, if the duration of the secondary video display period is six frames, switching to 10-Hz pause drive occurs in the video display period, meaning that the duration of the vertical display period changes to six frames. Furthermore, such a refresh rate as to make the vertical display period shorter than the secondary video display period may be employed during the video display period. In the present embodiment, for example, in the case where the duration of the secondary video display period is four frames, it is possible to make a switch to 30-Hz pause drive, such that the duration of the vertical display period becomes two frames. Moreover, in the case where the duration of the secondary video display period is six frames, it is possible to make a switch to 15-Hz pause drive, such that the duration of the vertical display period becomes four frames. In addition, any mode can be employed so long as pause drive is performed during the video display period, and refresh is performed at least once every secondary video display period.

<2.2 Effects>

In the present embodiment, when the duration of the secondary video display period is two or more frames, pause drive is performed during the video display period, and the duration of the vertical display period is the same as the duration of the secondary video display period. Thus, it is possible to further reduce power consumption compared to the first embodiment while allowing images displayed on the screen during the video display period to correspond to the animation video that should originally be displayed.

<3. Third Embodiment>
<3.1 Operations>

Figure 9:
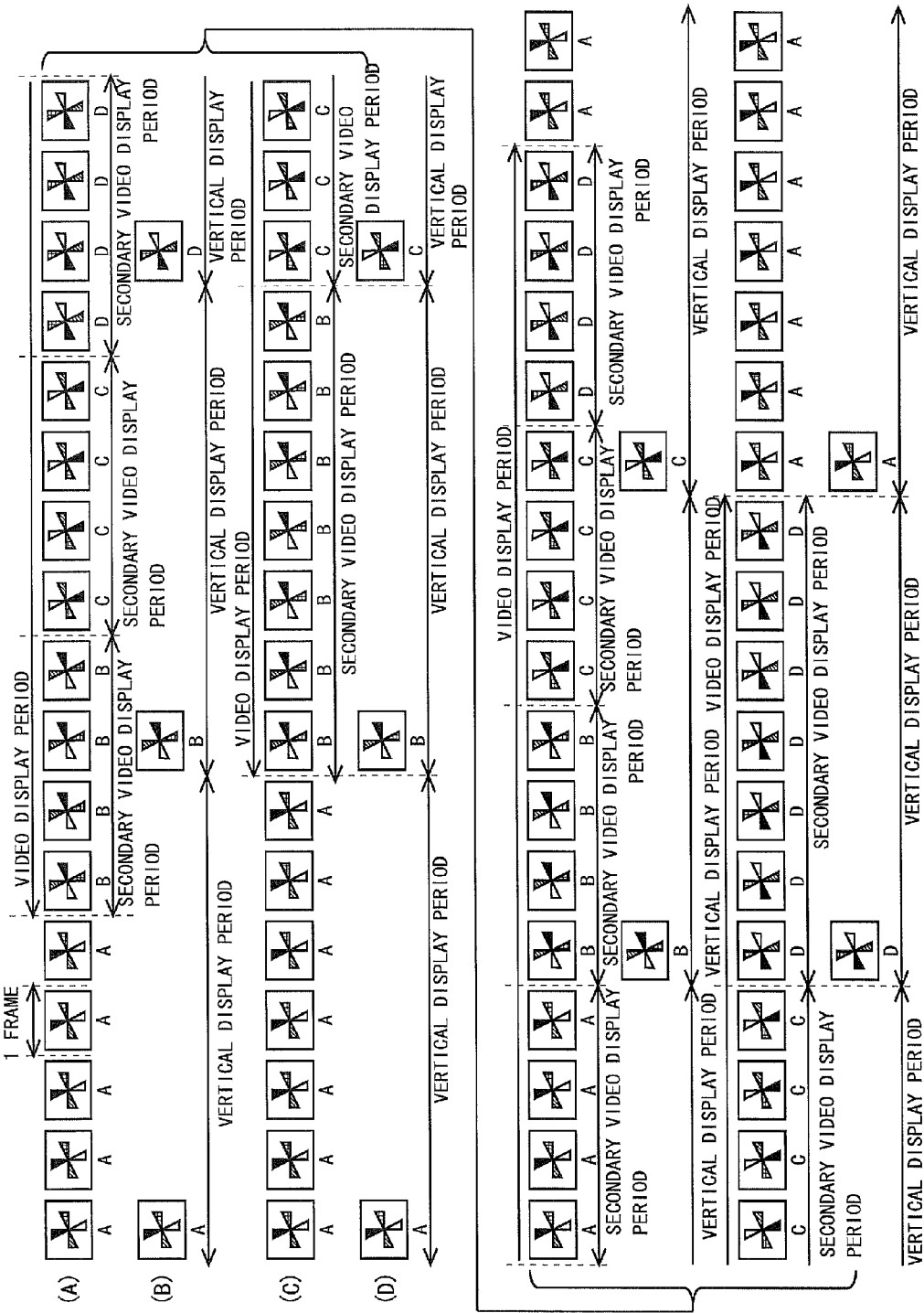
FIG. 9 is a diagram describing an operational example of a liquid crystal display device in a third embodiment of the present invention where part (A) shows animation images on a conventional liquid crystal display device, part (B) shows refresh images on the conventional liquid crystal display device, part (C) shows animation images in the third embodiment, and part (D) shows refresh images in the third embodiment.

FIG. 9 is a diagram describing an operational example of a liquid crystal display device 2 in a third embodiment of the present invention. FIG. 9(A) shows animation images (windmill) on a conventional liquid crystal display device. In FIG. 9(A), as in FIG. 8(A), the duration of the video display period is 28 frames. FIG. 9(B) shows refresh images on the conventional liquid crystal display device. More specifically, the refresh images on the conventional liquid crystal display device result from the refreshing for the animation images shown in FIG. 9(A). FIG. 9(C) shows animation images (windmill) in the present embodiment. As shown in FIG. 9(C), the duration of the video display period is 21 frames. FIG. 9(D) shows refresh images in the present embodiment. More specifically, the refresh images in the present embodiment result from the refreshing for the animation images shown in FIG. 9(C). Note that the present embodiment is basically the same as the first embodiment except for operations, and therefore, any descriptions of their common points will be omitted. In the present embodiment, 8.6-Hz pause drive is performed regardless of during the video display period or not. That is, the duration of the vertical display period is seven frames, as in the periods before and after the video display period. In this manner, the duration of the vertical display period does not vary between the video display period and other periods, which is the same as in the case of the conventional liquid crystal display device.

In the examples shown in FIGS. 9(A) and 9(C), prior to the video display period, the animation image in each frame is image A. In such a case, both in the conventional liquid crystal display device and the liquid crystal display device 2 of the present embodiment, 8.6-Hz pause drive is performed, so that image A is displayed on the screen. This is the same as in the conventional liquid crystal display device and the first and second embodiments. As shown in FIG. 9(A), in the case of the conventional liquid crystal display device, the video display period starts independently of the duration of the vertical display period. More specifically, the video display period starts before the first refresh frame of the video display period. On the other hand, in the present embodiment, the video display period starts in connection with the duration of the vertical display period, as shown in FIG. 9(C). More specifically, the video display period starts simultaneously with the start of the first refresh frame of the video display period. However, as will be described, so long as the duration of the secondary video display period is the same as or longer than the duration of the vertical display period, it is not requisite for the video display period to start at the same times as the start of the first refresh frame of the video display period.

In the conventional liquid crystal display device, once the video display period starts, the frame images that constitute the animation video are switched every four frames, in the order: images B to D, then A to D, independently of the duration of the vertical display period, as shown in FIG. 9(A). That is, the duration of the secondary video display period is four frames, which is shorter than the duration of the vertical display period. For such an animation video, if refresh is performed every duration of the vertical display period, i.e., seven frames, some images are not refreshed, though the animation video should be displayed on the screen in the order: images B to D, then A to D. As a result, the animation video is displayed in the order: images B, D, B, and C, as shown in FIG. 9(B). Therefore, the animation video does not change smoothly during the video display period. Note that a similar problem occurs even in the case where the timing of refresh is off before or after the start of animation such that refresh is performed in the first frame of the video display period, as in the operational example of the conventional liquid crystal display device provided in conjunction with the descriptions of the first embodiment.

On the other hand, in the present embodiment, the frame images that constitute the animation video are switched every seven frames in the order: B to D, in accordance with the duration of the vertical display period, as shown in FIG. 9(C). That is, the video display period lasts for the same duration as the refresh period, i.e., seven frames. Such a video display period can be set, for example, by the timing generator 230 changing the timing control for video data generation in the video data generation circuit 240 in accordance with the duration of the vertical display period (i.e., the refresh rate). However, the method for realizing the setting of the video display period is not limited to this, and any method can be employed so long as the video display period can be set by a component of the electronic device.

In this manner, in the case where the video display period lasts for seven frames, i.e., the same duration as the refresh period, for the animation video which changes every duration of the secondary video display period, i.e., every seven frames, in the order: images B to D, refresh is performed every duration of the vertical display period, i.e., every seven frames. Accordingly, the duration of the secondary video display period is set to be the same as the duration of the vertical display period, so that refresh is performed individually for images B to D included in the animation video. Therefore, images B to D included in the animation video are all displayed on the screen, as shown in FIG. 9(D). After the video display period, the animation image in each frame is image A, and therefore, following the first refresh after the video display period, image A continues to be displayed on the screen. Here, the video display period is set such that the first frame of the secondary video display period is the refresh frame, but the present invention is not limited to this. Further, although the duration of the video display period changes in accordance with the duration of the vertical display period, it might be unnecessary for the duration of the video display period to change in such a manner, depending on the original duration of the secondary video display period.

The present embodiment is not limited by the examples shown in FIGS. 9(C) and 9(D). For example, when the duration of the vertical display period is five frames, the duration of the secondary video display period is five frames. Moreover, when the duration of the vertical display period is six frames, the duration of the secondary video display period is six frames. Further, the secondary video display period can be set to any duration so long as it has the same duration as the vertical display period. Alternatively, the secondary video display period may be set longer than the vertical display period. For example, in the present embodiment, in the case where the duration of the vertical display period is five frames, the duration of the secondary video display period can be set to ten frames. Moreover, in the case where the duration of the vertical display period is six frames, the duration of the secondary video display period can be set to, for example, eight frames. In addition, any mode can be employed so long as pause drive is performed during the video display period, and refresh is performed at least once every secondary video display period.

<3.2 Effects>

In the present embodiment, when pause drive is performed during the video display period, the duration of the secondary video display period is the same as the duration of the vertical display period. Therefore, it is possible to achieve similar effects to those achieved by the second embodiment. Further, it is not necessary to change the refresh rate during the video display period. Thus, it is possible to further reduce power consumption compared to the second embodiment.

<4. Fourth Embodiment>

<4.1 Configurations of the Host and the Display Control Circuit>

In the first embodiment, the video data generation circuit 240 is provided in the display control circuit 200. However, in the present embodiment, the video data generation circuit 240 is provided in the host 1. Note that the present embodiment is basically the same as the first embodiment, except for the configuration of the host 1 and the configuration of the display control circuit 200, and therefore, any descriptions of their common points will be omitted. Further, among the components of the present embodiment, the same components as in the first embodiment are denoted by the same reference characters, and any descriptions thereof will be omitted for the sake of convenience.

Figure 10:
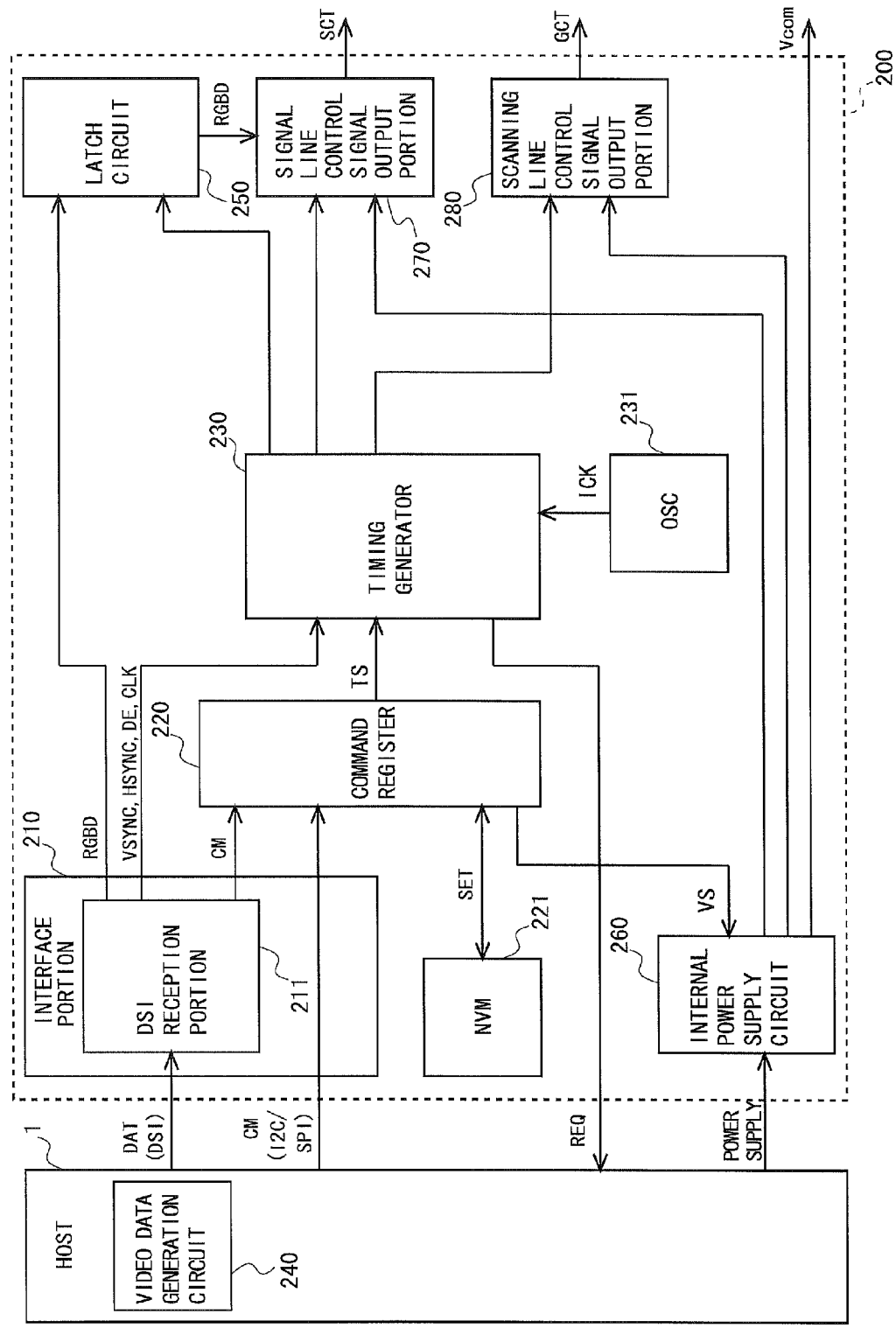
FIG. 10 is a block diagram describing the configuration of a host and the configuration of a display control circuit supporting the video mode without RAM in a fourth embodiment of the present invention.

FIG. 10 is a block diagram describing the configuration of the host 1 and the configuration of the display control circuit 200 for the video mode without RAM in the present embodiment. In the present embodiment, the video data generation circuit 240 is provided in the host 1, rather than in the display control circuit 200, as shown in FIG. 10. RGB data RGBD, which is generated video data, is transmitted to the display control circuit 200 as data DAT. Note that the video data generation circuit 240 shown in FIG. 10 operates basically in the same manner as in the first embodiment.

Figure 11:
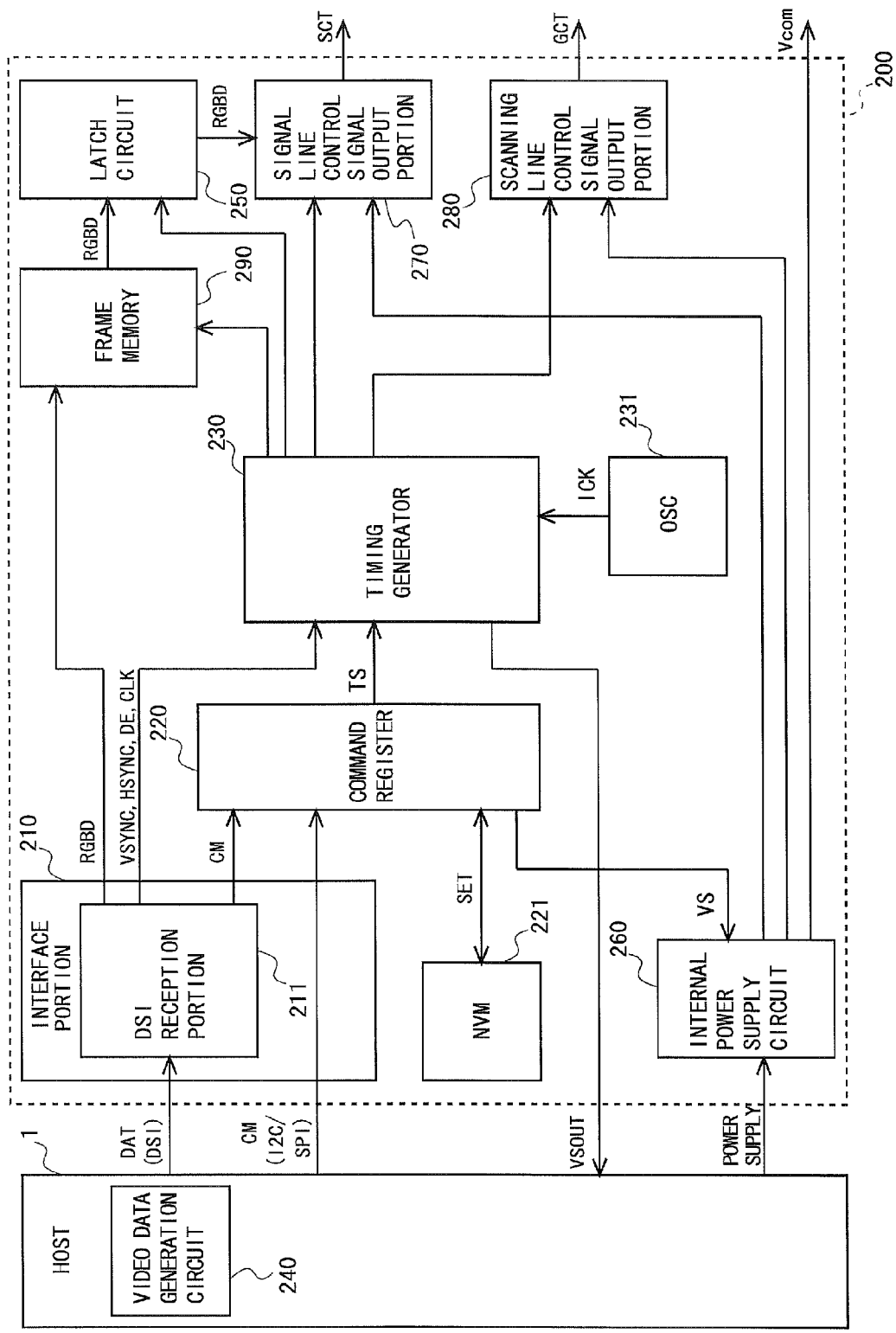
FIG. 11 is a block diagram describing the configuration of a host and the configuration of a display control circuit supporting the video mode with RAM capture in the fourth embodiment.

FIG. 11 is a block diagram describing the configuration of the host 1 and the configuration of the display control circuit 200 for the video mode with RAM capture in the present embodiment. In the present embodiment, the video data generation circuit 240 is provided in the host 1, rather than in the display control circuit 200, as shown in FIG. 11. Note that the video data generation circuit 240, etc., shown in FIG. 11 operate in the same manner as those shown in FIG. 10, and therefore, any descriptions thereof will be omitted.

Figure 12:
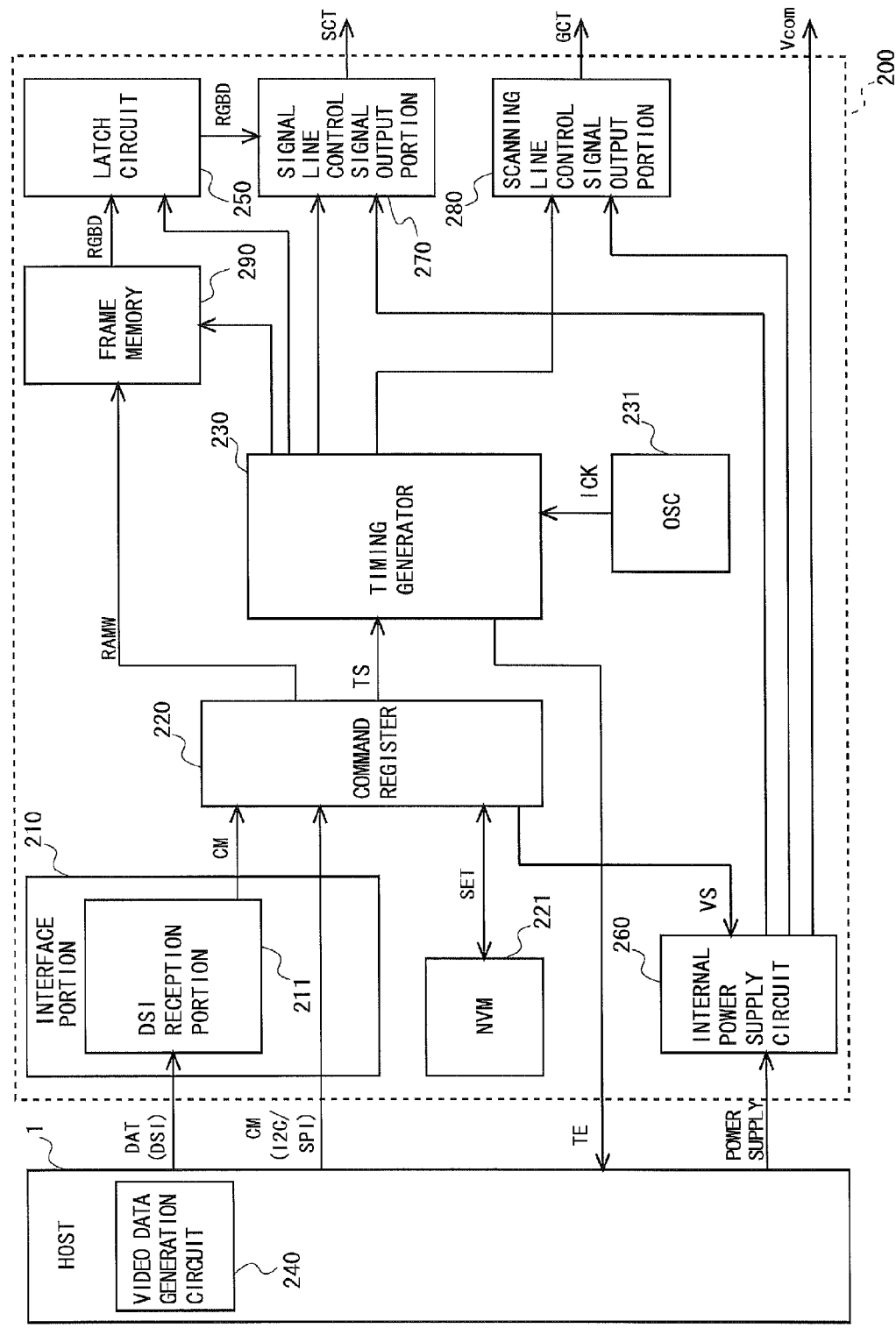
FIG. 12 is a block diagram describing the configuration of a host and the configuration of a display control circuit supporting the command mode with RAM write in the fourth embodiment.

FIG. 12 is a block diagram describing the configuration of the host 1 and the configuration of the display control circuit 200 for the command mode with RAM write in the present embodiment. The video data generation circuit 240 is provided in the host 1, rather than in the display control circuit 200, as shown in FIG. 12. The video data generation circuit 240, etc., shown in FIG. 12 operate basically in the same manner as those shown in FIG. 10. However, the video data generated by the video data generation circuit 240 is transmitted to the display control circuit 200 by the host 1 as a RAM write signal RAMW corresponding to data for the image included in the command data CM.

<4.2 Effects>

In the present embodiment, similar effects to those achieved by the first embodiment can be achieved in the modes for which the video data generation circuit 240 is provided in the host 1.

<5. Others>

The electronic devices according to the above embodiments have been described as displaying images in accordance with the animation function and/or the rotation function, but they may be adapted to also provide normal image display without activating the animation function or the rotation function.

The above embodiments have been described with respect to the modes using the interfaces that support the DSI standard, but interfaces that support other standards may be used.

The first embodiment has been described taking as examples the modes for which the video data generation circuit 240 is provided in the display control circuit 200, and the fourth embodiment has been described taking as examples the modes for which the video data generation circuit 240 is provided in the display control circuit 200, but the present invention is not limited by these examples. The video data generation circuit 240 may be provided outside both the host 1 and the display control circuit 200. Note that in the case where the video data generation circuit 240 is provided in the liquid crystal display device 2 but outside the display control circuit 200, the video data generation circuit 240 and the display control circuit 200 collectively function as a control portion.

The fourth embodiment may be used in combination with the second embodiment or the third embodiment. Note that in the case where the fourth embodiment is used in combination with the third embodiment, the setting of the duration of the secondary video display period in accordance with the duration of the vertical display period is performed, for example, by the video data generation circuit 240 of the host 1 setting the duration of the secondary video display period in accordance with data corresponding to the command data CM on which the timing control signal CS and the rate data are based.

The descriptions given in the above embodiments regarding the animation function are also true for the rotation function. Moreover, the descriptions given regarding the rotation function are also true for the animation function.

In addition, various modifications can be made to the embodiments without departing from the spirit of the present invention.

As described above, the present invention renders it possible to provide a display device capable of displaying a smooth video even when pause drive is performed, an electronic device including the display device, and a method for driving the display device.

INDUSTRIAL APPLICABILITY

The present invention can be applied to display devices in which pause drive is performed, electronic devices including the display devices, and methods for driving the display device drives.

DESCRIPTION OF THE REFERENCE CHARACTERS

1 host
2 liquid crystal display device
10 liquid crystal display panel
20 FPC
30 backlight unit
100 display portion
110 image forming portion
111 TFT (thin-film transistor)
200 display control circuit
210 interface portion
211 DSI reception portion
220 command register
221 NVM (non-volatile memory)
230 timing generator (refresh rate control portion)
231 OSC (oscillator)
240 video data generation circuit
250 latch circuit
260 internal power supply circuit
270 signal line control signal output portion
280 scanning line control signal output portion
290 frame memory (RAM)
300 signal line drive circuit
400 scanning line drive circuit
SL signal line
GL scanning line

The invention claimed is:

1. A display device comprising:
    a display including a screen and a plurality of image generators;
    a drive circuit that drives the display; and
    a control circuit that controls the drive circuit, wherein,
    the control circuit includes a refresh rate control circuit that controls a refresh rate determined in accordance with a proportion of a refresh period for refreshing the screen and a no-refresh period for pausing the refreshing of the screen,
    when the control circuit controls the drive circuit in accordance with a refresh rate at which the no-refresh period has a duration greater than or equal to the refresh period and when the screen starts displaying a video in a video display period, the control circuit sets a duration of a first period of the video display period to be less than or equal to a duration of a second period of the video display period, and
    the first period of the video display period lasts from the start of the refresh period to the start of another refresh period immediately following the refresh period, and the second period of the video display period is a period in which one of a plurality of frame images included in the video is displayable on the screen.

2. The display device according to claim 1, wherein the control circuit further includes a video data generation circuit that generates video data representing the video from frame image data representing a predetermined number of the frame images.

3. The display device according to claim 2, wherein the refresh rate control circuit changes the refresh rate such that the first period of the video display period is the refresh period.

4. The display device according to claim 2, wherein the first period of the video display period includes the refresh period and the no-refresh period.

5. The display device according to claim 4, wherein the refresh rate control circuit sets the duration of the first period of the video display period in accordance with the duration of the second period.

6. The display device according to claim 4, wherein the video data generation circuit sets the duration of the second period of the video display period in accordance with the duration of the first period.

7. The display device according to claim 1, wherein each of the plurality of image generators includes a thin-film transistor with a control terminal connected to a scanning line in the display, a first conductive terminal connected to a signal line in the display, a second conductive terminal to which a voltage in accordance with an image to be displayed is applied, the second conductive terminal being connected to a pixel electrode in the display, and a channel layer made of an oxide semiconductor.

8. An electronic device comprising:
    a display device of claim 1; and
    a video data generation circuit that generates video data representing the video from frame image data representing a predetermined number of the frame images.

9. The electronic device according to claim 8, wherein the refresh rate control circuit changes the refresh rate such that the first period of the video display period is the refresh period.

10. The electronic device according to claim 8, wherein the first period of the video display period includes the refresh period and the no-refresh period.

11. The electronic device according to claim 10, wherein the refresh rate control circuit sets the duration of the first period of the video display period in accordance with the duration of the second period.

12. The electronic device according to claim 10, wherein the video data generation circuit sets the duration of the second period of the video display period in accordance with the duration of the first period.

13. The electronic device according to claim 8, wherein each of the plurality of image generators includes a thin-film transistor with a control terminal connected to a scanning line in the display, a first conductive terminal connected to a signal line in the display, a second conductive terminal to which a voltage in accordance with an image to be displayed is applied, the second conductive terminal being connected to a pixel electrode in the display, and a channel layer made of an oxide semiconductor.

14. A method for driving a display device with a display including a screen and a plurality of image generators, a drive circuit that drives the display, and a control circuit that controls the drive circuit, the method comprising:
 a video display step of, when a no-refresh period for pausing the refreshing of the screen has a duration greater than or equal to a refresh period for refreshing the screen and when the screen starts displaying a video in a display period, setting a duration of a first period of the video display period to be less than or equal to a duration of a second period of the video display period, wherein
 the first period of the video display period lasts from the start of the refresh period to the start of another refresh period immediately following the refresh period, and the second period of the video display period is a period in which one of a plurality of frame images included in the video is displayable on the screen, and
 the video display step includes a refresh rate control step of controlling a refresh rate determined in accordance with the proportion of the refresh period and the no-refresh period.

15. The drive method according to claim 14, wherein in the refresh rate control step, the refresh rate is changed such that the first period of the video display period is the refresh period.

16. The drive method according to claim 14, wherein the first period of the video display period includes the refresh period and the no-refresh period.

17. The drive method according to claim 16, wherein in the refresh rate control step, the duration of the first period of the video display period is set in accordance with the duration of the second period.

18. The drive method according to claim 16, wherein in the video display step, the duration of the second period of the video display period is set in accordance with the duration of the first period.

19. The display device according to claim 1, wherein:
 the control circuit includes an interface that receives data; and
 the control circuit controls the drive circuit according to the data received at the interface.

20. The display device according to claim 19, wherein:
 the control circuit generates video data according to the data received at the interface, or
 the control circuit receives already-generated video data at the interface.

* * * * *